US011465089B2

(12) United States Patent
Satake

(10) Patent No.: US 11,465,089 B2
(45) Date of Patent: Oct. 11, 2022

(54) POWDER CONTAINER

(71) Applicant: SEIKO EPSON CORPORATION, Tokyo (JP)

(72) Inventor: Akihiro Satake, Mikawa-machi (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 17/023,451

(22) Filed: Sep. 17, 2020

(65) Prior Publication Data

US 2021/0086126 A1 Mar. 25, 2021

(30) Foreign Application Priority Data

Sep. 19, 2019 (JP) .............................. JP2019-170227

(51) Int. Cl.
| | | |
|---|---|---|
| *B01D 46/48* | (2006.01) | |
| *B01D 46/24* | (2006.01) | |
| *D21G 9/00* | (2006.01) | |
| *B01D 46/44* | (2006.01) | |
| *B01D 46/42* | (2006.01) | |
| *B01D 46/58* | (2022.01) | |

(52) U.S. Cl.
CPC ............. *B01D 46/48* (2013.01); *B01D 46/24* (2013.01); *B01D 46/4254* (2013.01); *B01D 46/44* (2013.01); *B01D 46/58* (2022.01); *D21G 9/00* (2013.01); *B01D 46/2407* (2013.01)

(58) Field of Classification Search
CPC .... B01D 46/0002; B01D 46/48; B01D 46/24; B01D 46/4254; B01D 46/44; B01D 46/58; B01D 46/70; B01D 46/71; B01D 46/2403; B01D 46/2407; D21G 9/00; D21B 1/08
See application file for complete search history.

(56) References Cited

FOREIGN PATENT DOCUMENTS

| JP | 2018-099637 A | 6/2018 | |
|---|---|---|---|
| JP | 2018099637 A * | 6/2018 | ............. B01D 46/24 |
| JP | WO2018043057 A1 * | 10/2018 | ............... B27N 3/04 |

OTHER PUBLICATIONS

JP2018099637A_ENG (Espacenet machine translation of Satake) (Year: 2018).*
JPWO2018043057A1_ENG (Espacenet machine translation of Miyazawa) (Year: 2018).*

* cited by examiner

*Primary Examiner* — Gabriel E Gitman
(74) *Attorney, Agent, or Firm* — Global IP Counselors, LLP

(57) ABSTRACT

A powder container including a filter that separates air and powder from each other, a hopper that includes a first opening portion installed below the filter, a second opening portion that has an opening area that is smaller than that of the first opening portion, and an inclined surface that partially overlaps the filter in plan view, a container box installed so as to be detachable from the hopper, the container box containing the powder, and a detection sensor (an optical sensor) installed outside the container box so as to oppose a side surface of the container box, the detection sensor being installed near the second opening portion and near a side of the inclined surface in a lower direction.

4 Claims, 11 Drawing Sheets

POWDER CONTAINER

The present application is based on, and claims priority from JP Application Serial Number 2019-170227, filed Sep. 19, 2019, the disclosure of which is hereby incorporated by reference herein in its entirety.

BACKGROUND

1. Technical Field

The present disclosure relates to a powder container that contains powder.

2. Related Art

Hitherto, an apparatus that collects dust-like matters such as fiber and particles with a filter is known (see JP-A-2018-099637, for example). The apparatus described in JP-A-2018-099637 is a sheet manufacturing apparatus that manufactures a sheet. The sheet manufacturing apparatus suctions removed substances (powder) such as waste powder that is not used to manufacture the sheet, and collects the suctioned removed substances with filters. In so doing, the collection box that collects the removed substances such as waste powder is, at the bottom portion thereof, provided with a mass detection portion that measures the mass of the removed substances collected in a collection bag. When the mass of the removed substances accumulated in the collection bag reaches a predetermined value, the user takes out the removed substances collected in the collection bag to a portion external to the sheet manufacturing apparatus.

However, in JP-A-2018-099637, regarding the manner in which the collected removed substances (powder) accumulate in the collection bag or in the collection box that does not use the collection bag, the upper surface of the accumulated powder may not be horizontal. Accordingly, when measuring by mass, it will be difficult to ascertain the accumulated height in an accurate manner when there is bulging and the like in a portion of the powder. Due to the above, the powder may flow over from the collection bag or the container box.

SUMMARY

A powder container including a filter that separates air and powder from each other, a hopper that includes a first opening portion installed below the filter, a second opening portion that is disposed below the first opening portion and that has an opening area that is smaller than that of the first opening portion, and an inclined surface that couples the first opening portion and the second opening portion to each other and that partially overlaps the filter in plan view, a container box that engages with the second opening portion at a portion below the hopper and that is installed in a detachable manner, the container box containing the powder falling through the second opening portion, and a detection sensor installed outside the container box so as to oppose a side surface of the container box, the detection sensor being installed near the second opening portion and near a side of the inclined surface in a lower direction. In the powder container, the detection sensor includes a light emitting element that emits light in a direction extending along the side of the inclined surface in the lower direction so that the light transmits through an area in the side surface of the container box, and a light receiving element that receives the light emitted from the light emitting element.

In the powder container described above, desirably, the container box has a window portion having translucency installed in the area in the side surface through which the light is transmitted.

In the powder container described above, desirably, when in plan view, the inclined surface is not provided in one directional side.

In the powder container described above, desirably, when detached from the hopper, the container box is configured to move in a direction intersecting a vertical direction, and the powder container further includes a shielding member installed between the detection sensor and the side surface through which the light is transmitted, the shielding member following a movement of the container box in the direction intersecting the vertical direction to shield a path of the light.

DESCRIPTION OF EXEMPLARY EMBODIMENTS

1. First Exemplary Embodiment

Hereinafter, a first exemplary embodiment of the present disclosure will be described with reference to the drawings.

Figure 1:
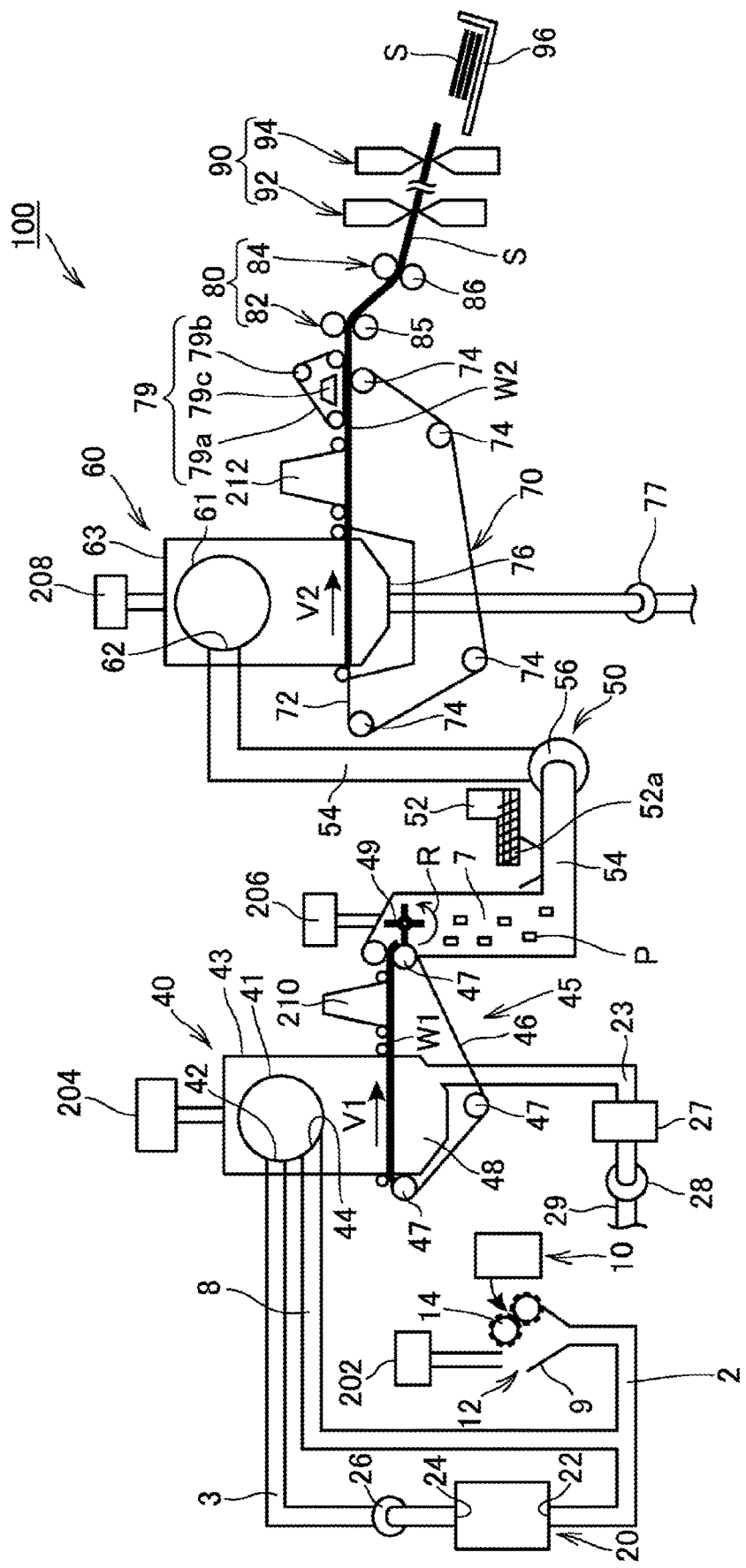
FIG. 1 is a schematic diagram illustrating a configuration of a sheet manufacturing apparatus according to a first exemplary embodiment.

FIG. 1 is a schematic diagram illustrating a configuration of a sheet manufacturing apparatus 100 according to the present exemplary embodiment.

The sheet manufacturing apparatus 100 of the present exemplary embodiment is an apparatus suitable for manufacturing a new sheet of paper by, after performing dry defibration and fiberizing used wastepaper such as confidential paper as the raw material, compressing, heating, and cutting the above. By mixing various additives to the fiberized raw material, the bond strength or the whiteness of the paper product may be improved, or a function such as color, aroma, or flame resistance may be added, according to the application. Furthermore, by forming the paper while controlling the density, the thickness, and the shape of the paper, paper of various thicknesses and sizes can be manufactured according to the application thereof such as A4-sized or A3-sized office paper, paper for name cards, and the like.

The sheet manufacturing apparatus 100 includes a feeding portion 10, a shredding portion 12, a defibrating portion 20, a screening portion 40, a first web forming portion 45, a rotor 49, a mixing portion 50, an accumulating portion 60, a second web forming portion 70, a transport portion 79, a sheet forming portion 80, and a cutting portion 90.

Furthermore, the sheet manufacturing apparatus 100 includes humidifying portions 202, 204, 206, 208, 210, and 212 with the aim of humidifying the raw material and/or humidifying the space through which the raw material passes. The humidifying portions 202, 204, 206, 208, 210, and 212 may be of any specific configuration including that of a steam type, a vaporizing type, a hot air and vaporizing type, and an ultrasonic type.

In the present exemplary embodiment, the humidifying portions 202, 204, 206, and 208 are each configured of a vaporizing or a hot-air and vaporizing humidifier. In other words, the humidifying portions 202, 204, 206, and 208 each include a filter (not shown) that is wetted with water. By passing air through the filter, humidified air with increased humidity is supplied. Furthermore, the humidifying portions 202, 204, 206, and 208 may include a heater (not shown) that effectively increases the humidity of the humidified air.

Furthermore, in the present exemplary embodiment, the humidifying portion 210 and the humidifying portion 212 are each configured of an ultrasonic humidifier. In other words, the humidifying portions 210 and 212 each include a vibrating portion (not shown) that atomizes water. The humidifying portions 210 and 212 supply mist generated by the vibrating portion.

The feeding portion 10 feeds the raw material to the shredding portion 12. The raw material in manufacturing the sheet with the sheet manufacturing apparatus 100 may be any material that includes fiber such as, for example, paper, pulp, a pulp sheet, fabric including non-woven fabric, or woven fabric. In the present exemplary embodiment, a configuration in which the sheet manufacturing apparatus 100 uses wastepaper as the raw material will be described as an example. The feeding portion 10 may be configured to include a stacker that stacks and accumulates wastepaper, and an automatic feeder that sends the wastepaper from the stacker to the shredding portion 12.

The shredding portion 12 cuts (shreds) the raw material fed from the feeding portion 10 into shredded pieces with shredding blades 14. The shredding blades 14 cut the raw material in midair such as in the atmosphere (in the air). The shredding portion 12 may be configured in a manner similar to that of a so-called shredder that includes a pair of shredding blades 14 that cut the raw material by nipping the raw material therebetween, and a driving portion (not shown) that rotates the shredding blades 14. The shape and the size of the shredded pieces may be of any shape and size that is suitable for the defibrating process in the defibrating portion 20. For example, the shredding portion cuts the raw material into pieces of paper that are each one to a few square centimeters or smaller.

The shredding portion 12 includes a shoot (a hopper) 9 that receives the falling shredded pieces cut by the shredding blades 14. The shoot 9 has, for example, a tapered shape in which the width becomes gradually smaller in a direction in which the shredded pieces flow (an advancing direction). Accordingly, the shoot 9 can receive a large amount of shredded pieces. A pipe 2 in communication with the defibrating portion 20 is coupled to the shoot 9. The pipe 2 forms a transport path through which the raw material (the shredded pieces) cut by the shredding blades 14 is transported to the defibrating portion 20. The shredded pieces are collected by the shoot 9, pass through the pipe 2, and are delivered (transported) to the defibrating portion 20.

Humidified air is fed to the shoot 9 included in the shredding portion 12 or to the vicinity of the shoot 9 with the humidifying portion 202. With the above, a phenomenon in which the shredded pieces cut by the shredding blades 14 being attached to inner surfaces of the shoot 9 and the pipe 2 by static electricity can be suppressed. Furthermore, since the shredded pieces cut by the shredding blades 14 are, together with the humidified air having high humidity, delivered to the defibrating portion 20, an effect of suppressing the defibrated objects inside the defibrating portion 20 from being attached can be expected as well. Furthermore, by feeding humidified air to the shredding blades 14, the humidifying portion 202 may be configured to remove static electricity from the raw material that is fed by the feeding portion 10. Furthermore, the removal of static electricity may be performed using an ionizer together with the humidifying portion 202.

The defibrating portion 20 defibrates the shredded pieces cut in the shredding portion 12. More specifically, the defibrating portion 20 performs the defibrating process on the raw material (the shredded pieces) cut by the shredding portion 12 and creates the defibrated objects. Note that "to defibrate" is to disentangle the raw material (the object to be defibrated), which is formed by a plurality of fibers bound together, into individual fibers. The defibrating portion 20 also functions to separate, from the fibers, substances such as resin particles, ink, toner, and a blur inhibitor attached to the raw material.

An object that has passed through the defibrating portion 20 is referred to as the defibrated object. Other than the disentangled fibers of the defibrated objects, the "defibrated objects" may contain particles of resin (resin to bind a plurality of fibers together), coloring materials such as ink and toner, additives such as blur inhibitor and a paper strong agent, which have been separated from the fibers when the fibers were disentangled. The disentangled defibrated object has a string-like shape or a ribbon-like shape. The disentangled defibrated objects may exist in a state in which the defibrated objects are not entangled with the other disentangled fibers (in an independent state) or may exist in a state in which the defibrated objects are entangled into aggregate with the other disentangled defibrated objects (in a state forming a so-called "lump").

The defibrating portion 20 performs dry defibration. Note that dry refers to performing a process such as the defibration not in a liquid but in midair such as in the atmosphere (in the air). In the present exemplary embodiment, the defibrating portion 20 uses an impeller mill. Specifically, the defibrating portion 20 includes a rotor (not shown) that rotates at high speed, and a liner (not shown) that is positioned at the periphery of the rotor. The shredded pieces cut at the shredding portion 12 are defibrated by being interposed between the rotor and the liner of the defibrating portion 20. The defibrating portion 20 generates airflow with the rotation of the rotor. The defibrating portion 20 is configured to, with the airflow, suction the shredded pieces, which are the raw material, through the pipe 2 and to transport the defibrated objects to a discharge port 24. The defibrated objects are sent out to a pipe 3 through the discharge port 24 and are delivered to the screening portion 40 through the pipe 3.

As described above, the defibrated objects created in the defibrating portion 20 are transported from the defibrating portion 20 to the screening portion 40 with the airflow generated by the defibrating portion 20.

Furthermore, in the present exemplary embodiment, the sheet manufacturing apparatus 100 includes a defibrating portion blower 26 that is an airflow generating apparatus, and the defibrated objects are transported to the screening portion 40 with the airflow generated by the defibrating portion blower 26. The defibrating portion blower 26 is attached to the pipe 3. The defibrating portion blower 26 suctions, together with the defibrated objects, air from the defibrating portion 20 and sends the air to the screening portion 40.

The screening portion 40 includes an introduction port 42 through which the defibrated objects that have been defibrated by the defibrating portion 20 flow from the pipe 3 together with the airflow. The screening portion 40 screens the defibrated objects introduced through the introduction port 42 by the length of the fiber. Specifically, the screening portion 40 screens, among the defibrated objects defibrated by the defibrating portion 20, the defibrated object that is equivalent to or smaller than a predetermined size as a first screened object and screens the defibrated object that is larger than the first screened object as a second screened object. The first screened object includes fiber, particles, or the like, and the second screened object includes, for example, a large fiber, an undefibrated piece (a shredded piece that has not been sufficiently defibrated), or a lump of aggregated or tangled defibrated fiber.

In the present exemplary embodiment, the screening portion 40 includes a drum portion (a sieve portion) 41, and a housing portion (a covering portion) 43 that houses the drum portion 41.

The drum portion 41 is a cylindrical sieve that is rotationally driven by a motor. The drum portion 41 includes a screen (a filter) and functions as a sieve. With the screen meshes, the drum portion 41 screens a first screened object that is smaller than the size of each screen mesh opening (opening), and a second screened object that is larger than the screen mesh opening. A wire screen, expand metal, which is an elongated metal plate with cutouts, a perforated metal in which holes are formed in a metal plate with a press machine or the like can be used as the screen of the drum portion 41.

The defibrated objects introduced into the introduction port 42 are, together with the airflow, sent into the drum portion 41, and the first screened objects fall downwards through the screen meshes of the drum portion 41 with the rotation of the drum portion 41. The second screened objects that cannot pass through the screen meshes of the drum portion 41 are made to flow and are guided to a discharge port 44 with the airflow flowing into the drum portion 41 through the introduction port 42, and are sent to a pipe 8.

The pipe 8 couples the inside of the drum portion 41 and the pipe 2 to each other. The second screened objects that flows through the pipe 8 flows through the pipe 2 together with the shredded pieces cut by the shredding portion 12, and are guided to an introduction port 22 of the defibrating portion 20. With the above, the second screened object is returned to the defibrating portion 20 and the defibrating process is performed thereon.

Furthermore, the first screened objects that are to be screened by the drum portion 41 passes through the screen meshes of the drum portion 41, are scattered into the air, and descend towards a mesh belt 46 of the first web forming portion 45 positioned below the drum portion 41.

The first web forming portion 45 (a separation portion) includes a mesh belt 46 (a separation belt), rollers 47, and a suction portion (a suction mechanism) 48. The mesh belt 46 is an endless belt stretched across three rollers 47 and is transported in a direction indicated by an arrow in the drawing with the movement of the rollers 47. A surface of the mesh belt 46 is configured of a screen in which openings each having a predetermined size are arranged. Among the first screened objects that descend from the screening portion 40, minute particles with sizes that pass through the screen meshes fall below the mesh belt 46, and the fibers with sizes that cannot pass through the screen meshes accumulate on the mesh belt 46 and are, together with the mesh belt 46, transported in the direction of the arrow. The minute particles that fall down from the mesh belt 46 include relatively small defibrated objects or ones that have low density (resin particles, coloring materials, additives, and the like), and are removed substances that are not used by the sheet manufacturing apparatus 100 in manufacturing the sheet S.

During normal operation in which the sheet S is manufactured, the mesh belt 46 moves at a uniform velocity V1. Note that during normal operation is during an operation other than the execution of control of starting and control of stopping the sheet manufacturing apparatus 100 and, more specifically, denotes the time when the sheet manufacturing apparatus 100 is manufacturing a sheet S of a desired quality.

Accordingly, the defibrated objects that have gone through the defibrating process in the defibrating portion 20 are screened into the first screened objects and the second screened objects at the screening portion 40. The second screened objects are returned to the defibrating portion 20. Furthermore, the first web forming portion 45 removes the removed substances from the first screened objects. The remains of the first screened object after the removed substances have been removed therefrom are materials suitable for manufacturing the sheet S, and such materials are accumulated on the mesh belt 46 to form the first web W1.

The suction portion 48 suctions the air from below the mesh belt 46. The suction portion 48 is coupled to a dust collecting portion 27 (a dust collector) through a pipe 23. The dust collecting portion 27 separates the minute particles (powder P1 described later) from the airflow. A collection blower 28 is installed downstream of the dust collecting portion 27. The collection blower 28 functions as a dust collecting suction portion that suctions the air from the dust collecting portion 27. Furthermore, the air discharged by the collection blower 28 is discharged to the outside of the sheet manufacturing apparatus 100 through a pipe 29.

In such a configuration, the collection blower 28 suctions the air from the suction portion 48 through the dust collecting portion 27. In the suction portion 48, the minute particles passing through the screen meshes of the mesh belt 46 are suctioned together with the air, and are sent to the dust collecting portion 27 through the pipe 23. The dust collecting portion 27 separates and accumulates the minute particles that have passed through the mesh belt 46 from the airflow.

Accordingly, the fibers obtained by removing the removed substances from the first screened objects are accumulated on the mesh belt 46 and the first web W1 is formed. The collection blower 28 performing suction promotes formation of the first web W1 on the mesh belt 46 and removes the removed substance in a prompt manner.

The humidifying portion 204 feeds humidified air to the space including the drum portion 41. The first screened objects are humidified in the screening portion 40 with the humidified air. With the above, attachment of the first screened objects to the mesh belt 46 with electrostatic force is weakened, which facilitates the separation of the first screened objects from the mesh belt 46. Furthermore, the above can suppress the first screened objects from, owing to electrostatic force, adhering to the rotor 49 and the inner walls of the housing portion 43. Furthermore, the removed substances can be suctioned in an efficient manner with the suction portion 48.

Note that the configuration in the sheet manufacturing apparatus 100 that screens and separates the first screened objects and the second screened objects is not limited to the screening portion 40 including the drum portion 41. For example, a configuration in which the defibrated objects that have gone through the defibrating process in the defibrating portion 20 are classified by a classifier may be adopted. For example, a cyclone classifier, an elbow jet classifier, or an eddy classifier can be used as the classifier. By using such a classifier, the first screened objects and the second screened objects can be screened and separated. Furthermore, the classifier described above can provide a configuration that separates and removes the removed substances including relatively small defibrated objects or ones that have low density (resin particles, coloring materials, additives, and the like). For example, the minute particles contained in the first screened objects may be removed from the first screened objects with the classifier. In such a case, the second screened objects may be, for example, returned to the defibrating portion 20, the removed substances may be collected by the dust collecting portion 27, and the first screened objects without the removed substances may be sent to a pipe 54.

In the transport path of the mesh belt 46, air including mist is fed downstream of the screening portion 40 with the humidifying portion 210. The mist that is minute particles of water that are created by the humidifying portion 210 descends towards the first web W1 and supplies moisture to the first web W1. With the above, the amount of moisture contained in the first web W1 can be controlled and attachment and the like of the fibers to the mesh belt 46 owing to static electricity can be suppressed.

The sheet manufacturing apparatus 100 includes the rotor 49 that fragmentizes the first web W1 accumulated on the mesh belt 46. The first web W1 is separated from the mesh belt 46 and is fragmentized by the rotor 49 at the position where the mesh belt 46 is turned back with the roller 47.

The first web W1 is a soft material formed into a web shape with the accumulation of the fibers. The rotor 49 disentangles the fibers of the first web W1 and processes the first web W1 so that resin can be easily mixed therewith at the mixing portion 50 described later.

While the configuration of the rotor 49 is optional, in the present exemplary embodiment, the rotor 49 can have a rotary blade shape in which a plate-shaped blades rotate. The rotor 49 is disposed at a position where the first web W1 separating from the mesh belt 46 and the blades come in contact with each other. With the rotation of the rotor 49 (rotation in a direction indicated by an arrow R in the drawing, for example), the blades impinge against and fragmentize the first web W1 that is separated from the mesh belt 46 and that is transported therefrom to create fragmented particles P.

The rotor 49 is, desirably, installed at a position where the blades of the rotor 49 do not collide with the mesh belt 46. For example, the distance between the distal ends of the blades of the rotor 49 and the mesh belt 46 can be set within the range of 0.05 mm to 0.5 mm, inclusive. In such a case, the rotor 49 can fragmentize the first web W1 efficiently without damaging the mesh belt 46.

The fragmented particles P fragmentized by the rotor 49 descend inside a pipe 7 and are delivered (transported) to the mixing portion 50 with the airflow inside the pipe 7. Furthermore, humidified air is fed to the space including the rotor 49 with the humidifying portion 206. With the above, a phenomenon in which the fibers are attached to the inside of the pipe 7 and to the blades of the rotor 49 by static electricity can be suppressed. Furthermore, since air with high humidity is fed to the mixing portion 50 through the pipe 7, effects caused by static electricity can be suppressed in the mixing portion 50 as well.

The mixing portion 50 includes an additive feeding portion 52 (a resin feeding portion) that feeds an additive containing resin, the pipe 54 that is in communication with the pipe 7 and through which the airflow containing fragmented particles P flows, and a mixing blower 56. The fragmented particles P are, as described above, fibers obtained by removing the removed substances from the first screened objects that have passed through the screening portion 40. The mixing portion 50 mixes an additive containing resin to the fibers constituting the fragmented particles P.

Airflow is generated in the mixing portion 50 with the mixing blower 56, and the fragmented particles P are transported through the pipe 54 while being mixed with the additive. Furthermore, the fragmented particles P become disentangled and become more fibrous while flowing through the pipe 7 and the pipe 54.

The additive feeding portion 52 (a resin containing portion) is coupled to an additive cartridge (not shown) that accumulates the additive therein and feeds the additive inside the additive cartridge to the pipe 54. The additive cartridge may be detachable from the additive feeding portion 52. Furthermore, the additive cartridge may include a configuration that refills the additive to the additive cartridge. The additive feeding portion 52 temporarily stores the additive formed of fine powder or minute particles inside the additive cartridge. The additive feeding portion 52 (the resin feeding portion) includes a discharge portion 52a that sends the temporarily stored additive to the pipe 54.

The discharge portion 52a includes a feeder (not shown) that sends out the additive stored in the additive feeding portion 52 to the pipe 54, and a shutter (not shown) that opens/closes the pipe line that couples the feeder and the pipe 54 to each other. When the shutter is closed, the pipe line or an opening that couples the discharge portion 52a and the pipe 54 to each other is closed, and feeding of the additive from the additive feeding portion 52 to the pipe 54 is cut off.

While the feeder of the discharge portion 52a is not operated, the additive is not fed to the pipe 54 through the discharge portion 52a; however, when a negative pressure is generated in the pipe 54, even when the feeder of the discharge portion 52a is stopped, the additive may flow into the pipe 54. By closing the discharge portion 52a, such a flow of the additive can be blocked reliably.

The additive fed by the additive feeding portion 52 contains resin to bind the plurality of fibers to each other. The resin contained in the additive is a thermoplastic resin or a thermosetting resin including, for example, AS resin, ABS resin, polypropylene, polyethylene, polyvinyl chloride, polystyrene, acryl resin, polyester resin, polyethylene terephthalate, polyphenylene ether, polybutylene terephthalate, nylon, polyamide, polycarbonate, polyacetal, polyphenylene sulfide, and polyetheretherketone. The above resins may be used alone or in mixtures as appropriate. In other words, the additive may contain a single substance or may be a mixture, or may contain a plurality of types of particles each configured of a single or a plurality of substances. Furthermore, the additive may be fibrous or may be powdery.

The resin included in the additive is melted by heat and binds a plurality of fibers to each other. Accordingly, while in a state in which the resin is mixed with the fibers, the fibers do not become bound to each other while the resin is not heated to the melting temperature.

Furthermore, other than the resin that binds the fibers to each other, the additive fed to the additive feeding portion 52 may contain, according to the type of sheet that is manufactured, a coloring agent that colors the fibers, an aggregation inhibitor that inhibits the fibers from becoming aggregated or the resin from becoming aggregated, or a flame retardant that impedes the fibers and the like from burning. Furthermore, the additive that does not contain a coloring agent may be colorless, may be colorless to a degree deeming the additive as colorless, or may be white.

The fragmented particles P descending the pipe 7 with the airflow generated by the mixing blower 56, and the additive fed from the additive feeding portion 52 are suctioned into the pipe 54 and are passed through the mixing blower 56. Due to the airflow generated by the mixing blower 56 and\or the action of the rotating portion such as the blades and the like included in the mixing blower 56, the fibers constituting the fragmented particles P and the additive are mixed together, and the mixture (a mixture of the first screened objects and the additive) is delivered to the accumulating portion 60 through the pipe 54.

Note that the mechanism mixing the first screened objects and the additive together is not limited to any particular mechanism, and may be a mechanism that agitates with high-speed rotating blades, or may be a mechanism that uses the rotation of a container such as a V-mixer. Such a mechanism may be installed before or after the mixing blower 56.

The accumulating portion 60 accumulates the defibrated objects that have been defibrated in the defibrating portion 20. More specifically, the mixture that has passed through the mixing portion 50 is introduced into the accumulating portion 60 through an introduction port 62. The accumulating portion 60 disentangles the entangled defibrated objects (fibers) and while allowing the fibers to fall, scatters the fibers in the air. Furthermore, when the resin in the additive fed from the additive feeding portion 52 is fibrous, the accumulating portion 60 disentangles the entangled resin. With the above, the accumulating portion 60 can accumulate the mixture on the second web forming portion 70 in a uniform manner.

The accumulating portion 60 includes a drum portion 61, and a housing portion (a covering portion) 63 that houses the drum portion 61. The drum portion 61 is a cylindrical sieve that is rotationally driven by a motor. The drum portion 61 includes a screen (a filter) and functions as a sieve. With the screen meshes, the drum portion 61 passes the fibers and the particles that are smaller than the screen mesh opening (opening) and descends the fibers and the particles from the drum portion 61. The configuration of the drum portion 61 is, for example, the same as the configuration of the drum portion 41.

Note that the "sieve" of the drum portion 61 do not have to have a function of screening a specific object. In other words, the "sieve" used as the drum portion 61 is referred to as one that includes a screen, and the drum portion 61 may have all the mixture that has been introduced to the drum portion 61 descend.

The second web forming portion 70 is disposed below the drum portion 61. The second web forming portion 70 accumulates the passing object that has passed through the accumulating portion 60 and forms the second web W2. The second web forming portion 70 includes, for example, a mesh belt 72, rollers 74, and a suction mechanism 76.

The mesh belt 72 is an endless belt stretched across a plurality of rollers 74 and is transported in a direction indicated by an arrow in the drawing with the movement of the rollers 74. The mesh belt 72 is, for example, made of metal, resin, fabric, or non-woven fabric. A surface of the mesh belt 72 is configured of a screen in which openings each having a predetermined size are arranged. Among the fibers and particles that descend from the drum portion 61, minute particles with sizes that pass through the screen meshes fall below the mesh belt 72, and the fibers with sizes that cannot pass through the screen meshes accumulate on the mesh belt 72 and are, together with the mesh belt 72, transported in the direction of the arrow. During the sheet S manufacturing operation, the mesh belt 72 moves at a uniform velocity V2.

The screen meshes of the mesh belt 72 are fine meshes and may be of sizes that do not allow most of the fibers and particles that descend from the drum portion 61 to pass therethrough.

The suction mechanism 76 is provided under the mesh belt 72 (on a side opposite the accumulating portion 60). The suction mechanism 76 includes a suction blower 77. With suction force of the suction blower 77, airflow directed downwards (airflow directed from the accumulating portion 60 towards the mesh belt 72) can be generated in the suction mechanism 76.

The mixture that has been scattered in the air with the accumulating portion 60 is suctioned onto the mesh belt 72 with the suction mechanism 76. With the above, the formation of the second web W2 on the mesh belt 72 is promoted and a discharge speed from the accumulating portion 60 can be increased. Furthermore, the suction mechanism 76 can form a downflow in the falling route of the mixture, and entangling of the defibrated objects and the additive while falling can be prevented.

The suction blower 77 (an accumulation suction portion) may discharge the air suctioned through the suction mechanism 76 to the outside of the sheet manufacturing apparatus 100 through a collecting filter (now shown). Alternatively, the air suctioned by the suction blower 77 may be sent to the dust collecting portion 27 to collect the removed substances contained in the air that the suction mechanism 76 has suctioned.

The humidifying portion 208 feeds humidified air to the space including the drum portion 61. The humidified air allows the inside of the accumulating portion 60 to become humidified, suppresses the attachment of the fibers and particles to a housing portion 63 due to electrostatic force, promptly descends the fibers and particles onto the mesh belt 72, and allows the second web W2 having a desirable shape to be formed.

As described above, by passing through the accumulating portion 60 and the second web forming portion 70 (a web forming process), the second web W2 that contains a lot of air and that is in a soft and swollen state is formed. The second web W2 accumulated on the mesh belt 72 is transported to the sheet forming portion 80.

In the transport path of the mesh belt 72, air including mist is fed downstream of the accumulating portion 60 with the humidifying portion 212. With the above, the mist created by the humidifying portion 212 is supplied to the second web W2, and the amount of moisture contained in the second web W2 is controlled. With the above, attachment and the like of the fibers to the mesh belt 72 owing to static electricity can be suppressed.

The sheet manufacturing apparatus 100 is provided with the transport portion 79 that transports the second web W2 on the mesh belt 72 to the sheet forming portion 80. The transport portion 79 includes, for example, a mesh belt 79a, rollers 79b, and a suction mechanism 79c.

The suction mechanism 79c includes a blower (not shown). An upwards airflow is generated in the mesh belt 79a with suction force of the blower. The airflow suctions the second web W2, and the second web W2 separated from the mesh belt 72 is attached to the mesh belt 79a. The mesh belt 79a moved by the rotation of the rollers 79b transports the second web W2 to the sheet forming portion 80. The moving speed of the mesh belt 72 and the moving speed of the mesh belt 79a are, for example, the same. As described above, the transport portion 79 peels the second web W2 formed on the mesh belt 72 from the mesh belt 72 and transports the second web W2.

The sheet forming portion 80 forms the sheet S from the accumulated object accumulated in the accumulating portion 60. More specifically, the sheet forming portion 80 compresses and heats the second web W2 (the accumulated object) that is accumulated on the mesh belt 72 and that is transported by the transport portion 79 and forms the sheet S. By applying heat to the fibers of the defibrated object contained in the second web W2 and to the additive, the sheet forming portion 80 binds the plurality of fibers in the mixture to each other through the additive (resin).

The sheet forming portion 80 includes a compressing portion 82 that compresses the second web W2, and a heating portion 84 that heats the second web W2 compressed by the compressing portion 82. The compressing portion 82 is constituted of a pair of calender rollers 85 and compresses the second web W2 by nipping the second web W2 at a predetermined nip pressure. By being compressed, the second web W2 becomes small in thickness, and the density of the second web W2 is increased. One of the pairs of calender rollers 85 is a driving roller that is driven by a motor (not shown), and the other is a driven roller. The calender rollers 85 are rotated by driving force of the motor (not shown). The calender rollers 85 transport the second web W2, which has become high in density by compression, towards the heating portion 84.

The heating portion 84 is configured of, for example, heating rollers (heater rollers) 86, a hot press forming apparatus, a hot plate, a hot air blower, an infrared heater, or a flash fuser. In the present exemplary embodiment, the heating portion 84 includes a pair of heating rollers 86. The heating rollers 86 are heated to a preset temperature with an externally or internally installed heater. The heating rollers 86 nip and heat the second web W2, which has been compressed by the calender rollers 85, to form the sheet S. Furthermore, one of the pairs of heating rollers 86 is a driving roller that is driven by a motor (not shown), and the other is a driven roller. The heating rollers 86 rotated by driving force of the motor (not shown) transport the heated sheet S towards the cutting portion 90.

Note that the number of calender rollers 85 included in the compressing portion 82 and the number of heating rollers 86 included in the heating portion 84 are not limited to any numbers in particular.

The cutting portion 90 cuts the sheet S formed by the sheet forming portion 80. In the present exemplary embodiment, the cutting portion 90 includes a first cutting portion 92 that cuts the sheet S in a direction intersecting the transport direction of the sheet S, and a second cutting portion 94 that cuts the sheet S in a direction parallel to the transport direction. The second cutting portion 94 cuts the sheet S that has passed through the first cutting portion 92, for example.

With the above, a single sheet S of a predetermined size is formed. The cut single sheet S is discharged to a discharge portion 96. The discharge portion 96 includes a tray or a stacker on which a sheet S of a predetermined size is mounted.

Figure 2:
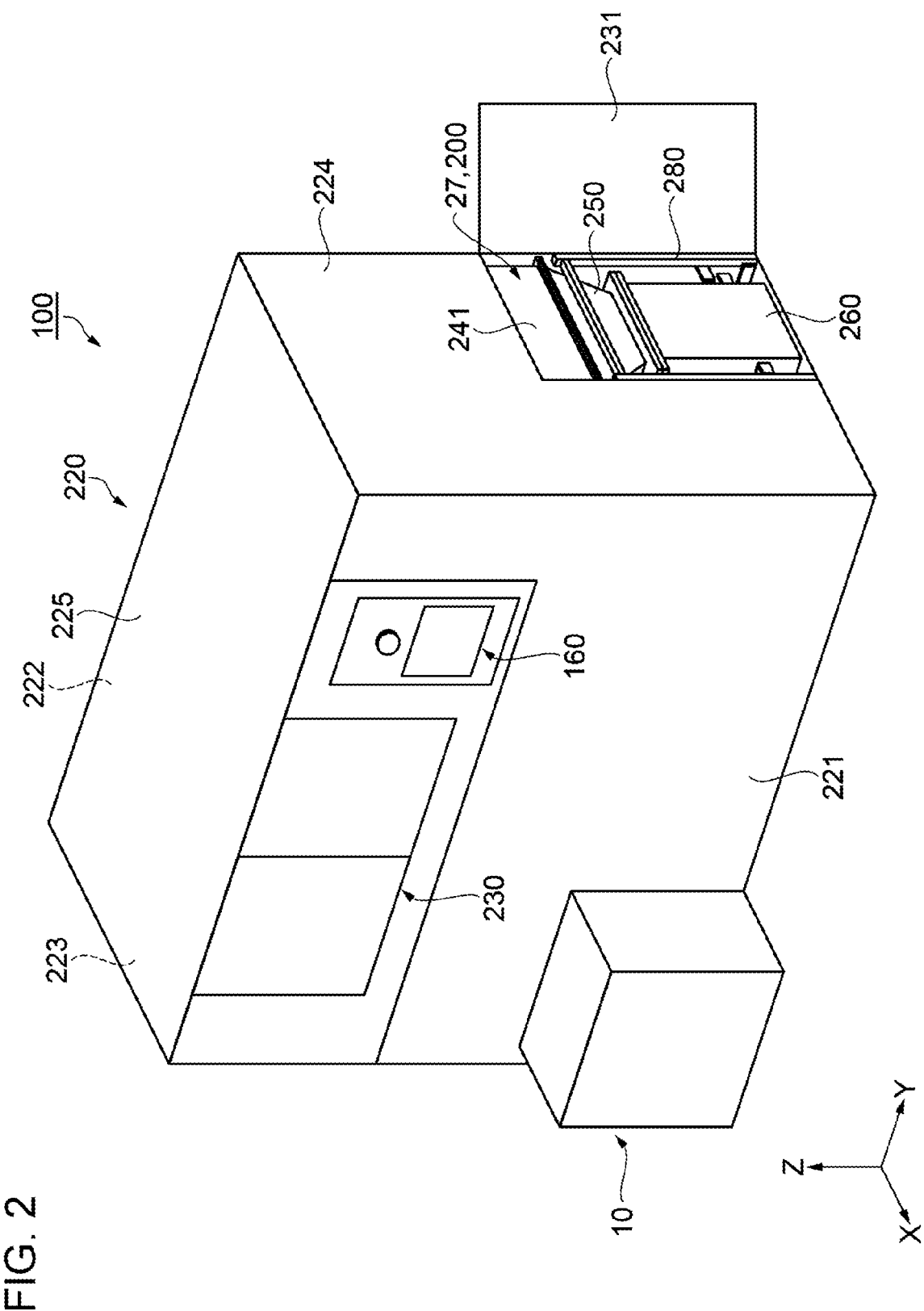
FIG. 2 is a schematic and external perspective view of the sheet manufacturing apparatus.

FIG. 2 is a schematic and external perspective view of the sheet manufacturing apparatus 100.

For the sake of description, the X-Y-Z coordinate system, the reference thereof being the sheet manufacturing apparatus 100 mounted on a horizontal surface, will be used. Specifically, a surface of a housing 220 on which a display portion 160 of the sheet manufacturing apparatus 100 is provided is a front portion 221, which is the front side. With the front portion 221 as a reference, the front-rear direction is the X direction, the front side or the front surface side is the +X direction, and the rear side or the rear surface side is the −X direction. The left-right direction that is, on a horizontal plane, orthogonal to the X direction of the sheet manufacturing apparatus 100 is the Y direction, in which the left direction or the left side is the −Y direction and the right direction or the right side is the +Y direction. Furthermore, a direction that is orthogonal to the X direction and the Y direction of the sheet manufacturing apparatus 100, in other words, a vertical direction with respect to a horizontal plane is the Z direction, in which the upward side or the upper side is the +Z direction and the downward side or the lower side is the −Z direction.

The directions are defined in the above manner, which will be used in the description hereinafter as appropriate. Note that the X direction is the depth direction of the sheet manufacturing apparatus 100, the Y direction is the width direction, and the Z direction is the height direction.

As illustrated in FIG. 2, the sheet manufacturing apparatus 100 includes the housing 220 that houses the components of the sheet manufacturing apparatus 100 described above. The housing 220 includes a front portion 221 that constitutes a front surface side, a rear surface portion 222 that constitutes a rear surface side, a left surface portion 223 that constitutes a left surface, a right surface portion 224 that constitutes a right surface, and an upper surface portion 225 that constitutes an upper surface.

The front portion 221 is provided with the feeding portion 10, in which a portion thereof is exposed, a display portion 160 that displays various pieces of information, and an opening/closing door 230. The display portion 160 includes a display panel 161 (FIG. 6) configured to display various pieces of information, and a touch panel 162 (FIG. 6) disposed so as to overlap the display panel 161. The display portion 160 is configured to detect the operation of the user with the touch panel 162. The opening/closing door 230 is a door that opens/closes to expose the cartridge that contains the additive.

The right surface portion 224 includes an openable/closable dust collecting portion cover 231 that covers the dust collecting portion 27. By opening the dust collecting portion cover 231, a container box 260 that is described later and that is included in the dust collecting portion 27 can be accessed from the outside. The dust collecting portion cover 231 is configured to be kept in a closed state with an electromagnetic lock 235 (see FIG. 6).

Figure 3:
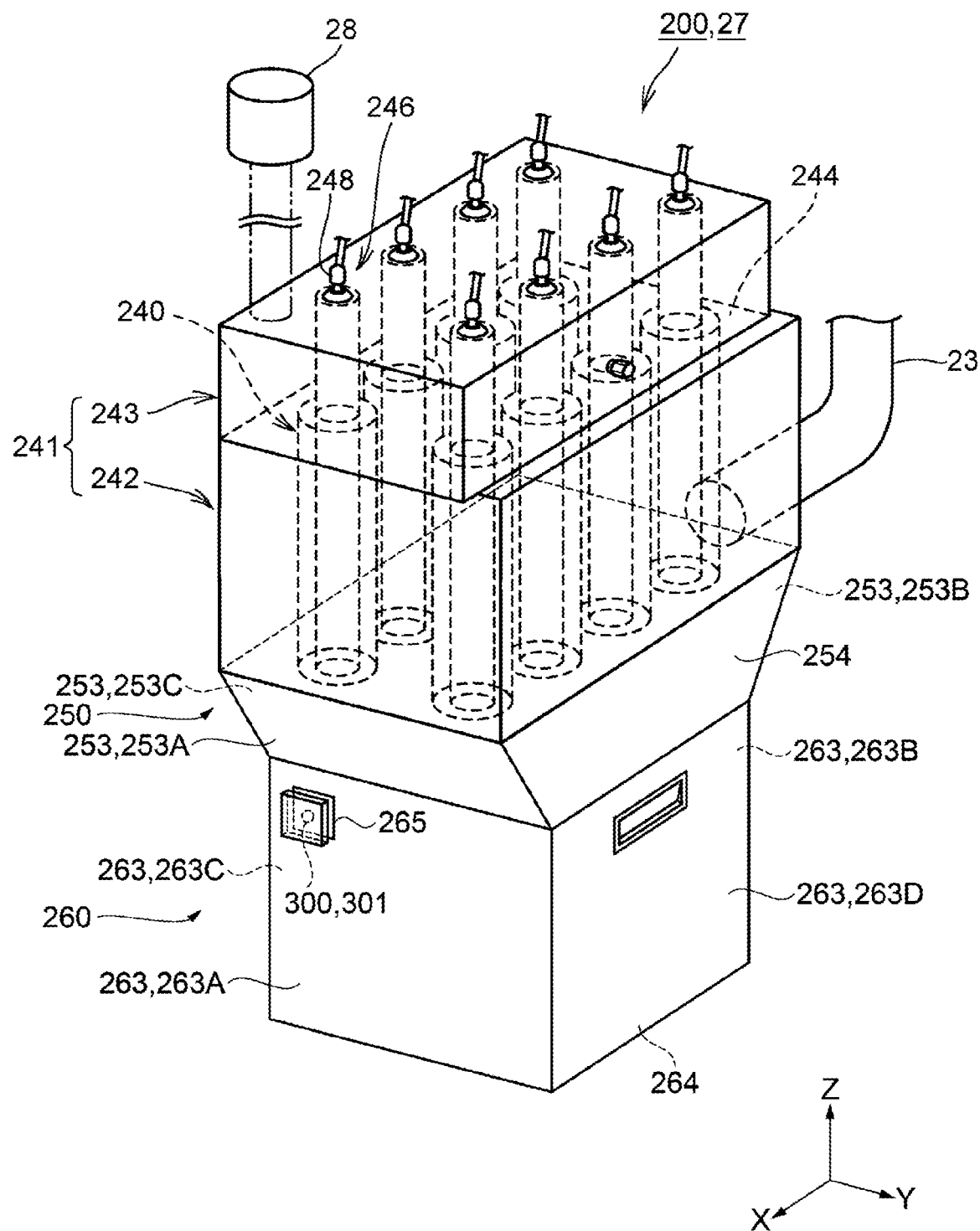
FIG. 3 is an explanatory drawing that illustrates a configuration of a powder container according to the first exemplary embodiment.
Figure 4:
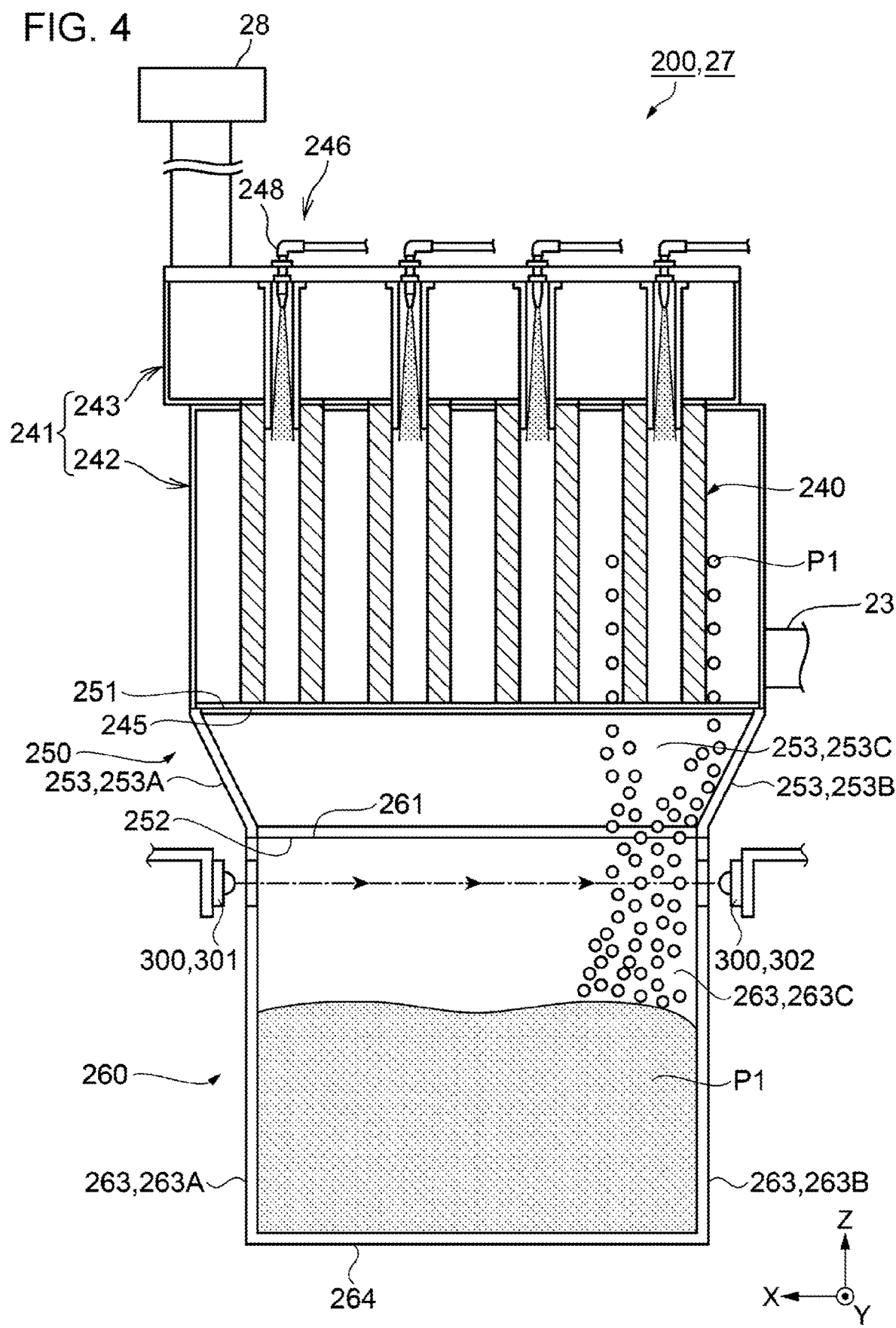
FIG. 4 is an explanatory drawing that illustrates a configuration of the powder container.
Figure 5:
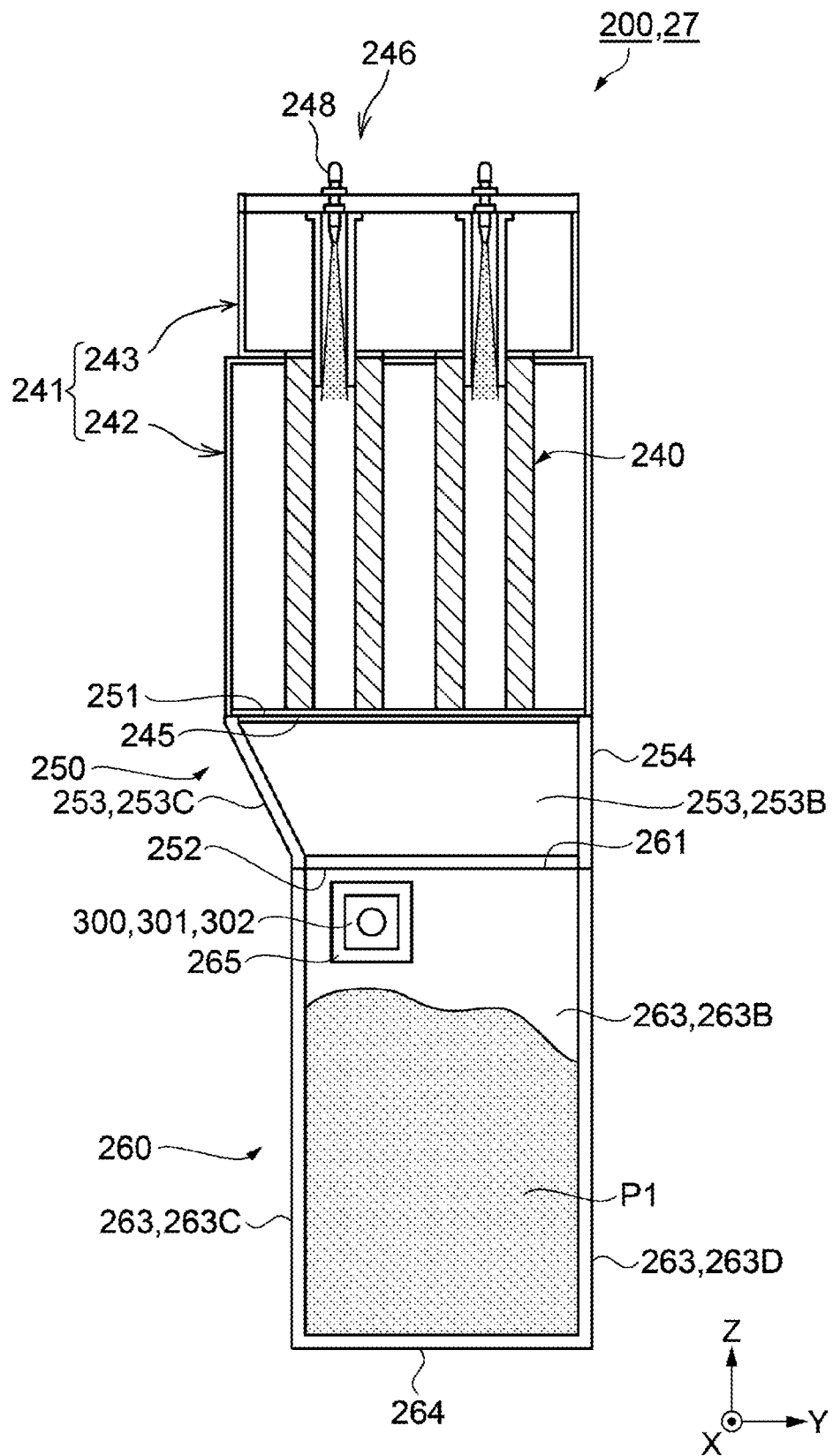
FIG. 5 is an explanatory drawing that illustrates a configuration of the powder container.

FIGS. 3 to 5 are explanatory drawings that illustrate a configuration of a powder container 200 according to the present exemplary embodiment. Specifically, FIG. 3 is a schematic and external perspective view illustrating the configuration of the powder container 200 (the dust collecting portion 27) and depicts the filters 240 as a perspective projection. FIG. 4 illustrates a schematic cross section of the powder container 200 (the dust collecting portion 27) viewed from the right side (in the +Y direction) of the sheet manufacturing apparatus 100. FIG. 5 illustrates a schematic cross section of the powder container 200 (the dust collecting portion 27) viewed from the front surface side (in the +X direction) of the sheet manufacturing apparatus 100. Note that FIGS. 4 and 5 illustrate an image of nozzles 248 discharging backwash airflows described later. Furthermore, FIGS. 4 and 5 also illustrate an image of the powder P1 falling from the filters 240 and a state in which the powder P1 has accumulated.

The dust collecting portion 27 described above is configured as the powder container 200 of the present disclosure. Hereinafter, the dust collecting portion 27 will be rephrased as the powder container 200.

The powder container 200 includes a collecting portion 241 including the filters 240, a hopper 250 installed below the collecting portion 241 (in other words, below the filters 240), and the container box 260 installed below the hopper 250.

The collection blower 28 is coupled to an upper portion of the collecting portion 241, and the pipe 23 to which the first web forming portion 45 (FIG. 1) is coupled to a lower portion of the collecting portion 241. With the operation of the collection blower 28, the collecting portion 241 suctions the removed substances that have passed through the mesh belt 46 (FIG. 1) at the first web forming portion 45 and collects the removed substances with the filters 240.

Specifically, the collecting portion 241 includes a first housing 242 that houses the filters 240, and a second housing 243 that is provided above the first housing 242 and that forms a space into which the air from which the removed substances have been removed by the filters 240 flow. A partition plate 244 is installed between the first housing 242 and the second housing 243. The plurality of (eight in the present exemplary embodiment) filters 240 are installed at predetermined intervals on the under surface of partition plate 244.

Each filter 240 has a cylindrical shape with a hollow internal space. The internal space of each filter 240 is in communication with the second housing 243. The removed substances included in the air flowing into the first housing 242 are collected with the filters 240, and the air from which the removed substances have been removed flows into the second housing 243 through the internal spaces of the filters 240. The air from inside the second housing 243 that has passed through the collection blower 28 may be discharged to the outside of the sheet manufacturing apparatus 100. In the example in FIG. 3, the filters 240 each have a cylindrical shape; however, the shapes and the number of filters 240 can be changed as appropriate and, for example, the filters 240 may each have a polygonal cylindrical shape.

In the collecting portion 241, the pipe 23 is coupled to the first housing 242, and the collection blower 28 is coupled to the second housing 243. In other words, the collecting portion 241 is partitioned into a pipe 23 side and a collection blower 28 side with the filters 240.

The collection blower 28 is positioned downstream of the filters 240 and suctions the air inside the second housing 243. In other words, the collection blower 28 is positioned downstream of the filters 240 and suctions, through the pipe 23, the air that is below the mesh belt 46 and that includes the removed substances to the inside of the first housing 242 that is in communication with the collection blower 28 through the filters 240. With the above, the removed substances falling below the mesh belt 46 is, together with the airflow, suctioned into the first housing 242.

With the operation of the collection blower 28, the air that contains the removed substances and that has flowed into the first housing 242 through the pipe 23 passes through the filters 240, and in this instance, the removed substances are collected by the filters 240. The air, from which the removed substances have been removed with the filters 240, passes through the space in the cylinder of each filter 240 and flows into the second housing 243. The filters 240 separate the air and the powder P1, which is the removed substances, in the above manner.

The sheet manufacturing apparatus 100 includes a backwashing mechanism that washes the filters 240 by backwashing the removed substances collected in the filters 240. Note that backwashing is an operation, a process, or a step of blowing out the removed substances adhered to the filters 240 by generating an airflow in a direction opposite to the direction of the airflow when the removed substances are collected with the filters 240. Furthermore, such an airflow in the opposite direction is referred to as a backwash airflow.

Each filter 240 includes, as a configuration that generates a backwash airflow with compressed air compressed by a compressor 247 (see FIG. 6), a compressed air pipe 246. Nozzles 248 that discharge the compressed air into the filters 240 are attached to distal ends of the compressed air pipes 246. When the compressed air is discharged through the nozzle 248, the compressed air generates an airflow (a backwash airflow) directed from the inside towards the outside of the filter 240.

With the backwash airflow, the removed substances collected by the filter 240 are separated and fall off from the surface of the filter 240. With such a backwash operation, the collecting capacity of the filter 240 can be recovered. Furthermore, the powder P1, which is the removed substances falling from the filters 240 by backwashing, falls into the hopper 250 through an opening portion 245 below the first housing 242.

The hopper 250 is installed below the collecting portion 241. The hopper 250 is a funnel-shaped frame body coupled to a lower portion of the first housing 242. In the present exemplary embodiment, the hopper 250 includes a first opening portion 251 that has a rectangular shape, and a second opening portion 252 that has a rectangular shape and that is disposed below the first opening portion 251. An opening area of the second opening portion 252 is smaller than that of the first opening portion 251.

The hopper 250 includes inclined surfaces 253 that couple the first opening portion 251 and the second opening portion 252 to each other. Portions of the inclined surfaces 253 overlap the filters 240 in plan view. Three inclined surfaces 253 corresponding to three sides, among the four sides, of the rectangular shape of the first opening portion 251 and that of the second opening portion 252 are formed. Specifically, the inclined surfaces 253 in the hopper 250 include a front inclined surface 253A that constitutes a side surface on the front surface side (in the +X direction), a rear inclined surface 253B that constitutes a side surface on the rear surface side (in the −X direction), and a left inclined surface 253C that constitutes a side surface on the left side (in the −Y direction).

Furthermore, the side surface on the right side (in the +Y direction) of the hopper 250 corresponding to the remaining side among the four sides is not formed as an inclined surface but becomes a side surface 254 formed by a surface that is parallel to the vertical direction (in the present exemplary embodiment, a surface that is parallel to the XZ plane). In the present exemplary embodiment, when in plan view viewed in the +Z direction, the inclined surface is not provided in one directional side of the hopper 250 corresponding to one side, among the four sides of the first opening portion 251 and that of the second opening portion 252 forming a rectangular shape. Furthermore, in the present exemplary embodiment, the surface that is not provided with the inclined surface is the side surface 254 on the right side.

The container box 260 is a rectangular parallelepiped hollow box disposed below the hopper 250. The container box 260 is a box that contains the powder P1 that has fallen from the filters 240 therein through the hopper 250. The container box 260 in the present exemplary embodiment is configured of a plate member formed of metal, such as aluminum. The container box 260 matches and engages a rectangular opening portion 261 on the upper side thereof with the second opening portion 252 of the hopper 250 and is installed in a detachable manner.

As illustrated in FIGS. 3 to 5, the container box 260 is formed in a box shape including four side surfaces 263 the extend downwards from sides of the rectangular opening portion 261, and a single bottom surface 264. Note that the side surface 263 of the container box 260 on the front surface side is a front side surface 263A, the side surface 263 on the rear surface side is a rear side surface 263B, the side surface 263 on the left side is a left side surface 263C, and the side surface 263 on the right side is a right side surface 263D.

A description of a manner in which the powder P1 becomes accumulated and an operation of an optical sensor 300, while in a state in which the container box 260 is attached to the hopper 250, will be described next.

When the powder P1 (the removed substances) collected by the filters 240 with the backwash airflow is separated and drops from the surfaces of the filters 240, the powder P1 falls into the hopper 250 through the opening portion 245 below the first housing 242.

Note that in FIG. 4, an image in which the powder P1 is falling from the filter 240 on the right side in the drawing is illustrated. Regarding the powder P1, the falling powder P1 on the inclined surfaces 253 in which portions thereof in plan view overlap the filters 240 falls along the inclined surfaces 253 and falls into the container box 260 through the second opening portion 252. In the present exemplary embodiment, all three of the inclined surfaces 253, namely, the front inclined surface 253A, the rear inclined surface 253B, and the left inclined surface 253C are configured to partially overlap the filters 240 in plan view.

The amount of powder P1 that falls along the inclined surfaces 253 that partially overlap the filters 240 in plan view and that falls into and accumulates in the container box 260 becomes large compared with the powder P1 that directly falls and accumulates in the container box 260 from the filters 240 that do not overlap the inclined surfaces 253. Furthermore, regarding the manner in which the powder P1 accumulates, more powder P1 accumulates in areas of the container box 260 near the inclined surfaces 253 and the areas overlapping the inclined surfaces 253. In the present exemplary embodiment, the areas where the accumulation amount of powder P1 becomes large are, when viewed in plan view, near the area in the container box 260 where the front inclined surface 253A and the left inclined surface 253C overlap each other, and near the area in the container box 260 where the rear inclined surface 253B and the left inclined surface 253C overlap each other.

In the present exemplary embodiment, the optical sensor 300 serving as a detection sensor that detects the height of the powder P1 accumulated in the container box 260 is installed external to the container box 260. Furthermore, the optical sensor 300 is installed in an area near the inclined surface 253 where, in the container box 260, the powder P1 tends to accumulate higher than the surroundings and at a height (position) closest to the extent possible to where the container box 260 becomes full.

In the present exemplary embodiment, the area in the container box 260 where the powder P1 tends to accumulate higher than the surroundings is, as described above, near the area where the front inclined surface 253A and the left inclined surface 253C overlap each other, and near the area where the rear inclined surface 253B and the left inclined surface 253C overlap each other. Accordingly, the optical sensor 300 is, as illustrated in FIGS. 3 and 4, installed in an upper portion of the side surface 263 of the container box 260 so that the container box 260 becomes close to full to the extent possible in the area, described above, inside the container box 2160 where the powder P1 tends to accumulate.

Specifically, the optical sensor 300 is installed outside of the container box 260 at portions opposing the front side surface 263A and the rear side surface 263B of the container box 260, and near the second opening portion 252 of the hopper 250 and near the sides of the front inclined surface 253A and the rear inclined surface 253B in the lower direction. Furthermore, the optical sensor 300 is configured to emit light in a direction (the X direction in the present exemplary embodiment) extending along the side of the left inclined surface 253C of the hopper 250 in the lower direction (in the present exemplary embodiment, the side corresponding to the left inclined surface 253C of the second opening portion 252) while transmitting the light through an area in the front side surface 263A of the container box 260 and to receive the emitted light while transmitting the light through an area in the rear side surface 263B.

The optical sensor 300 is installed on the outside of the container box 260 at positions opposing the front side surface 263A and the rear side surface 263B of the container box 260, at positions on the upper sides of the front side surface 263A and the rear side surface 263B, and at positions that oppose the area near the left inclined surface 253C. Note that the optical sensor 300 includes a light emitting element 301 that opposes the front side surface 263A, and a light receiving element 302 that opposes the rear side surface 263B.

As described above, since the container box 260 of the present exemplary embodiment is configured of a plate member formed of metal, such as aluminum, the light from the optical sensor 300 does not transmit therethrough. Accordingly, window portions 265 that have translucency that transmits the light through the side surfaces 263 are installed in the container box 260. Specifically, the window portions 265 that have translucency are installed in the container box 260 in areas in the front side surface 263A and the rear side surface 263B where the light of the optical sensor 300 is transmitted. The window portions 265 in the present exemplary embodiment is configured of a transparent acryl resin member.

Figure 6:
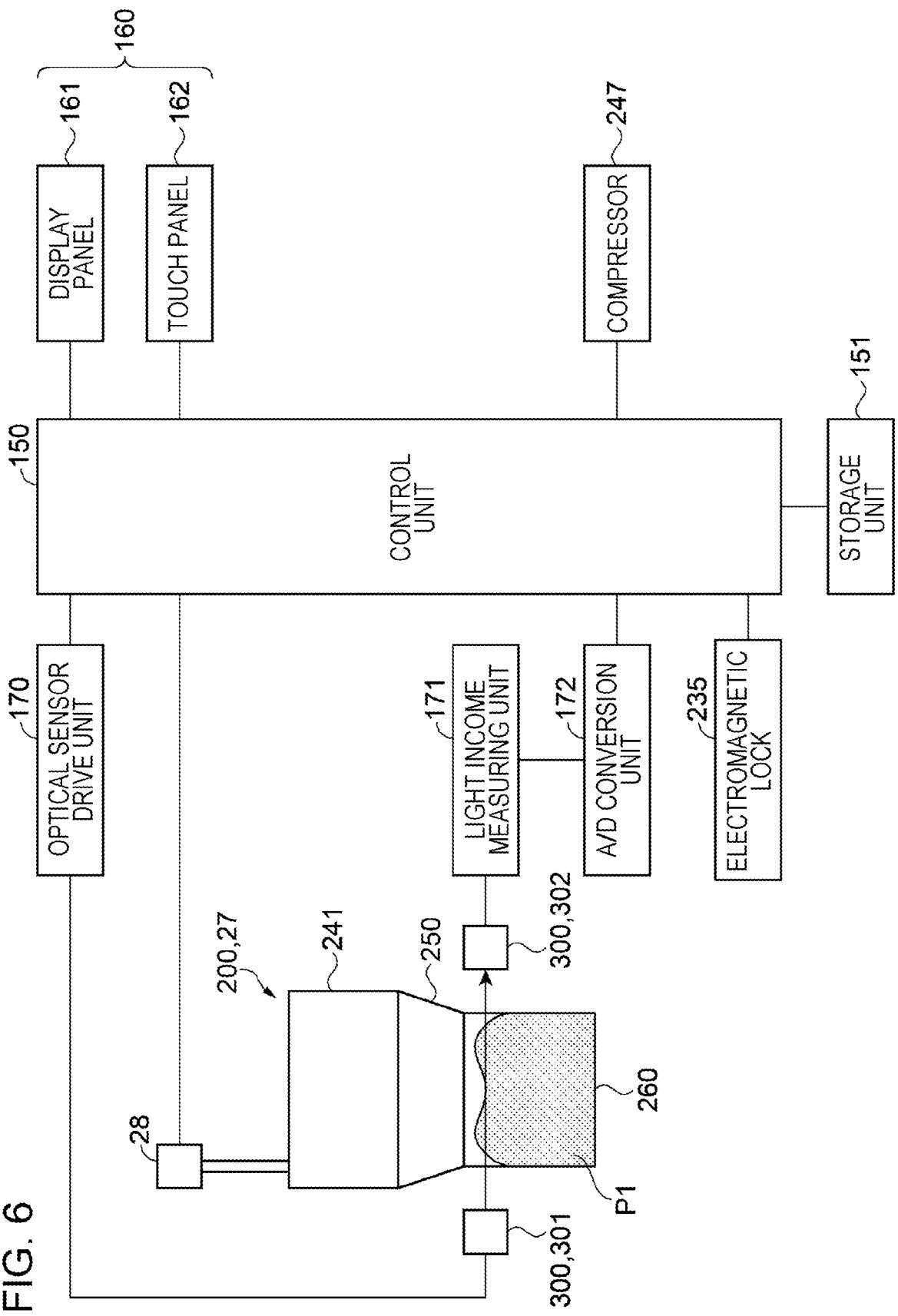
FIG. 6 is a diagram illustrating a configuration of a control system.

FIG. 6 is a diagram illustrating a configuration of a control system. Note that FIG. 6 illustrates a control system of the optical sensor 300 in the powder container 200 of the present exemplary embodiment as an example of a controlled object of the control unit 150.

The control system includes the control unit 150 and the storage unit 151, and the collection blower 28, the display portion 160, an optical sensor driving portion 170, the optical sensor 300, a light income measuring unit 171, an A/D conversion unit 172, the electromagnetic lock 235, and the compressor 247 that are controlled by the control unit 150. Furthermore, the control unit 150 controls the operations of the motors that drive various portions, the fans, the heaters, and the humidifiers that are illustrated in FIG. 1.

The control unit 150 includes a processor (not shown) that controls the sheet manufacturing apparatus 100 by executing a program, and the storage unit 151 that stores the program, which the processor executes, and data. The processor is an arithmetic processing unit such as a central processing unit (CPU) and controls various portions of the sheet manufacturing apparatus 100 by executing a control program stored in the storage unit 151.

The control unit 150 is coupled to the display panel 161 of the display portion 160 and displays various screens by driving the display panel 161. For example, the control unit 150 displays operation screens including the operation status of the sheet manufacturing apparatus 100, notifying images and notifying text messages to the operator (the user) of the sheet manufacturing apparatus 100, icons, numeric keys, and the like. The touch panel 162 detects touch operations, and outputs operation signals indicating the operation position to the control unit 150. The control unit 150 specifies the operation detail based on the operation position detected by the touch panel 162 and the content of the screen displayed on the display panel 161.

The control unit 150 controls various portions of the sheet manufacturing apparatus 100 according to the operation on the touch panel 162 or on the preset content. In such a case, the controlled object of the control unit 150 includes the shredding portion 12, the defibrating portion 20, the screening portion 40, the first web forming portion 45, the mixing portion 50, the accumulating portion 60, the second web forming portion 70, the transport portion 79, the sheet forming portion 80, and the cutting portion 90.

Specifically, the control unit 150 controls the defibrating portion blower 26, the mixing blower 56, the suction blower 77, other blowers, and the motors. Furthermore, the control unit 150 controls the humidifying portions 202, 204, 206, 208, 210, and 212. With such control, the control unit 150 starts manufacturing the sheets with the sheet manufacturing apparatus 100. Furthermore, the control unit 150 controls the on/off of the collection blower 28.

Referring to FIG. 6, the control system of the optical sensor 300 in the powder container 200 of the present exemplary embodiment will be described as an example of the controlled object of the control unit 150.

When cleaning of the powder container 200 is instructed with the operation on the touch panel 162, the control unit 150 actuates the compressor 247 and discharges compressed air through the nozzles 248. When, due to the control on the touch panel 162, opening of the dust collecting portion cover 231 is instructed, the control unit 150 releases the electromagnetic lock 235.

The control unit 150 controls the optical sensor 300 and detects the height (the amount) of the powder P1 contained and accumulated in the container box 260. The control unit 150 instructs the optical sensor driving portion 170 to drive the optical sensor 300. The optical sensor driving portion 170 drives the light emitting element 301 constituting the optical sensor 300 by applying a predetermined voltage to the light emitting element 301.

The light emitting element 301 emits light by being driven by the optical sensor driving portion 170. The light that has been emitted with the illuminated light emitting element 301 is transmitted through the window portion 265 in the front side surface 263A of the container box 260 that opposes the light emitting element 301, and is transmitted through the inside of the container box 260.

In the present exemplary embodiment, near infrared light is used as the light emitted by the light emitting element 301. Near infrared light has high transmittance among the infrared lights and since the quantity of infrared light absorbed by the powder P1 is large, a change in light quantity described later can be increased (the output of the light receiving element 302 can be made prominent). Accordingly, the change in light quantity can be easily and reliably detected. Furthermore, since near infrared light has, different from other infrared lights, no heating effect, there is no need to consider the effect that the heat has on the powder P1.

The light income measuring unit 171 causes the light (near infrared light) that has been transmitted through the inside of the container box 260 and the window portion 265 in the rear side surface 263B of the container box 260 to be received by the corresponding light receiving element 302. Subsequently, the A/D conversion unit 172 converts the quantity (electric current) of light received by the light receiving element 302 into a voltage with an analog amplifier (not shown), converts the amplified signal into a digital signal, and outputs the digital signal.

The storage unit 151 stores a program describing a control procedure of the detection operation, and a standard light quantity that determines the presence of the powder P1. The storage unit 151 stores, as the standard light quantity, the light intensity of when the powder P1 inside the container box 260 has reached a predetermined height and a standard amount. Note that a state in which the predetermined height and the standard amount have been reached is, in the present exemplary embodiment, a state in which the container box 260 is filled with the powder P1 to the height (the position) where the optical sensor 300 is installed. Note that hereinafter, a state in which the inside of the container box 260 is filled up with the powder P1 is appropriately referred to as a state in which there is powder P1, and a state in which the container box 260 is not yet filled up with powder P1 is appropriately referred to as a state in which there is no powder P1.

The control unit 150 reads a program for determining the presence of the powder P1 (whether the standard amount has been reached), and the standard light quantity from the storage unit 151, compares the input light quantity of the near infrared light with the standard light quantity to determine whether the powder P1 is present inside the container box 260. Specifically, the control unit 150 determines that there is no powder P1 when the detected light quantity is larger than the standard light quantity. Furthermore, when the detected light quantity is similar to the standard light quantity, the control unit 150 determines that there is powder P1.

As described above, when the detected light quantity is larger than the standard light quantity, the control unit 150 determines that the amount of powder P1 accumulated in the container box 260 has not yet reached the standard amount (is not full). Furthermore, when the detected light quantity is similar to the standard light quantity, the control unit 150 determines that the amount of powder P1 accumulated in the container box 260 has reached the standard amount (is full).

When it is determined with the optical sensor 300 that the amount of powder P1 accumulated in the container box 260 has reached the standard amount, the control unit 150 executes control of stopping the sheet manufacturing apparatus 100, and notifies an instruction by emitting sound and through the display panel 161 suggesting discharging the powder P1 accumulated in the container box 260. Specifically, while the sheet manufacturing apparatus 100 is in operation, the control unit 150 makes the sheet manufacturing apparatus 100 transition to maintenance mode, which gives an instruction to discharge the powder P1, from paper manufacturing mode, which manufactures paper.

Figure 7:
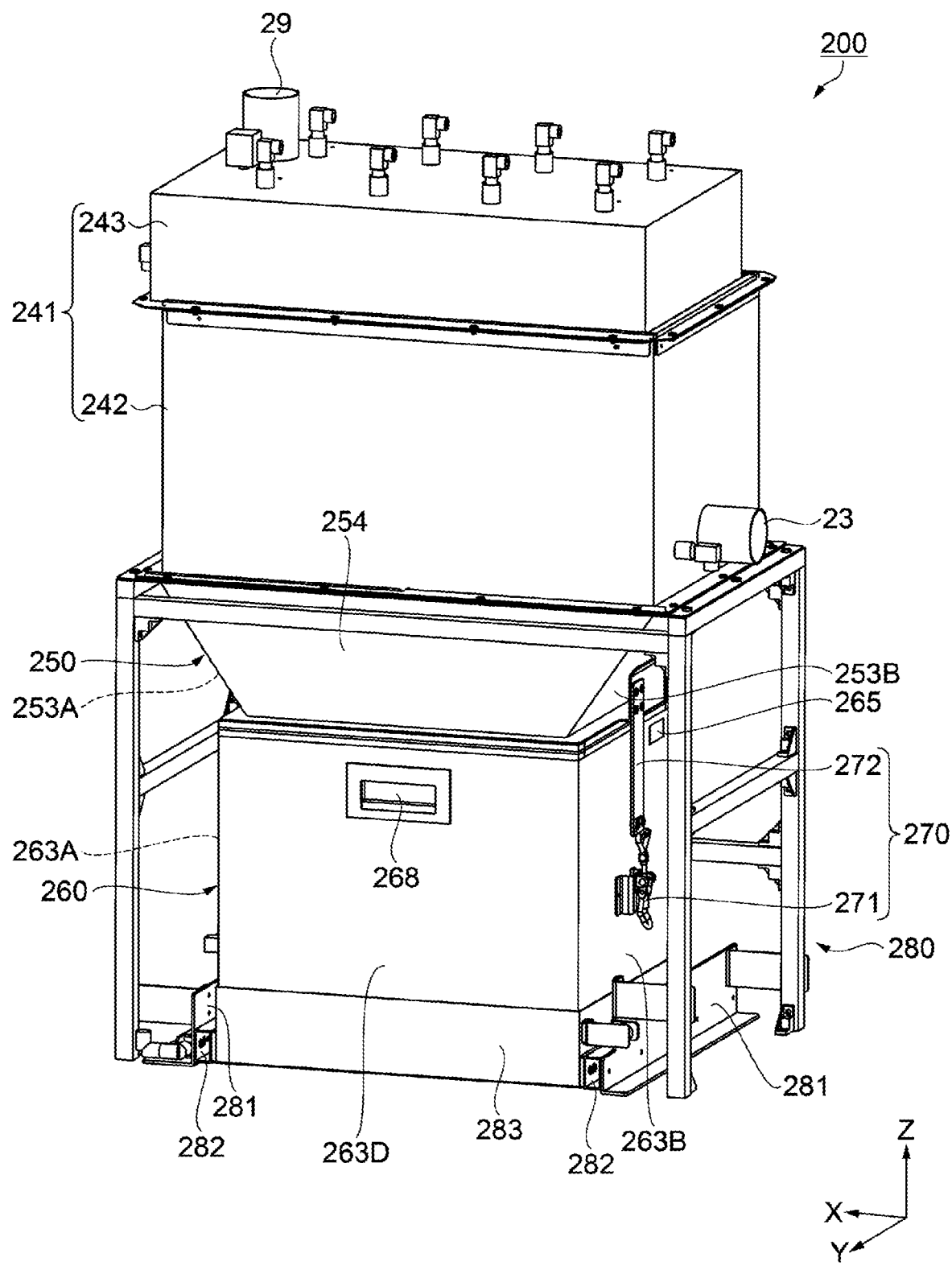
FIG. 7 is an explanatory drawing illustrating a procedure of detaching a container box from a hopper.
Figure 8:
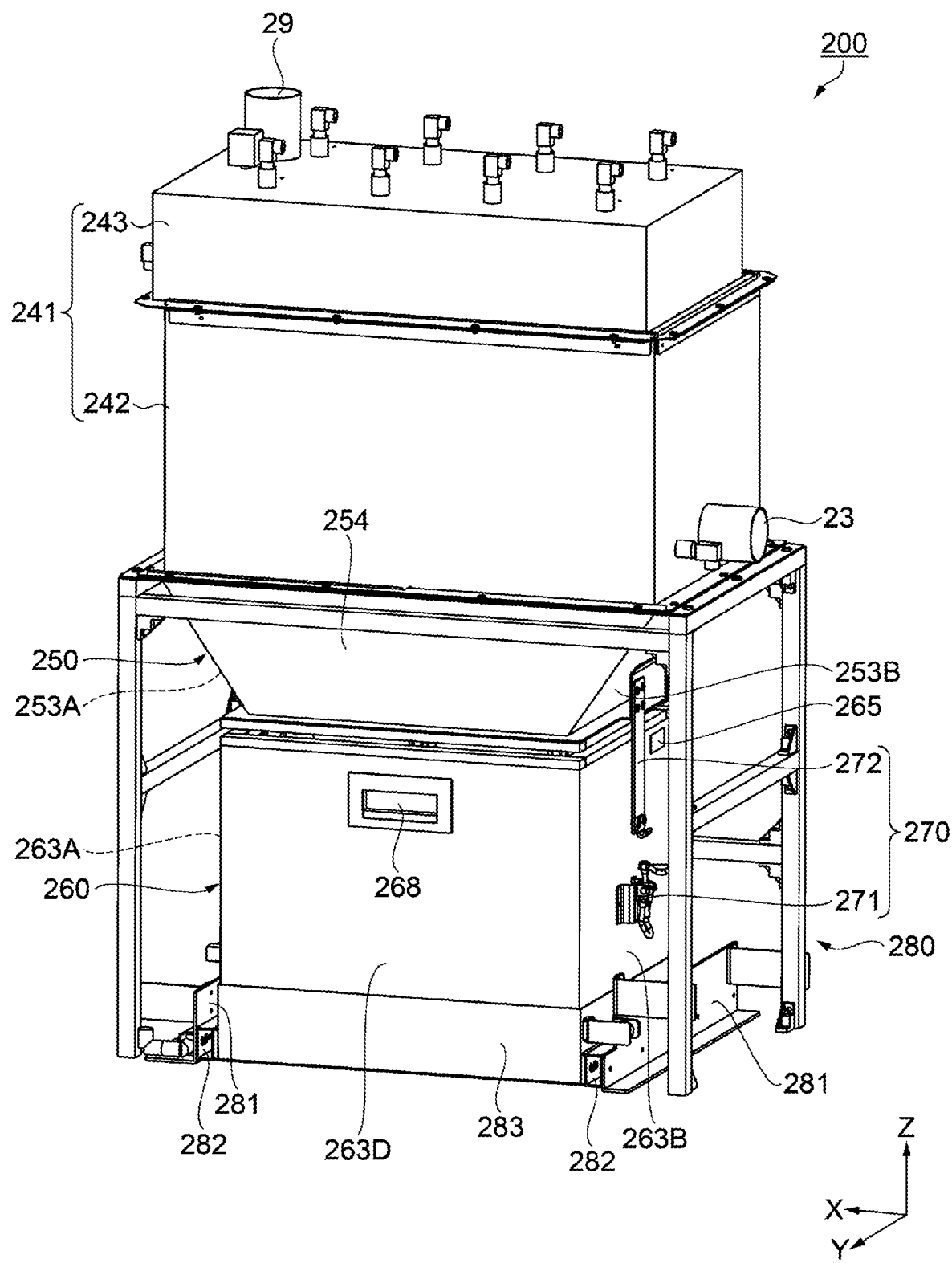
FIG. 8 is an explanatory drawing illustrating the procedure of detaching the container box from the hopper.
Figure 9:
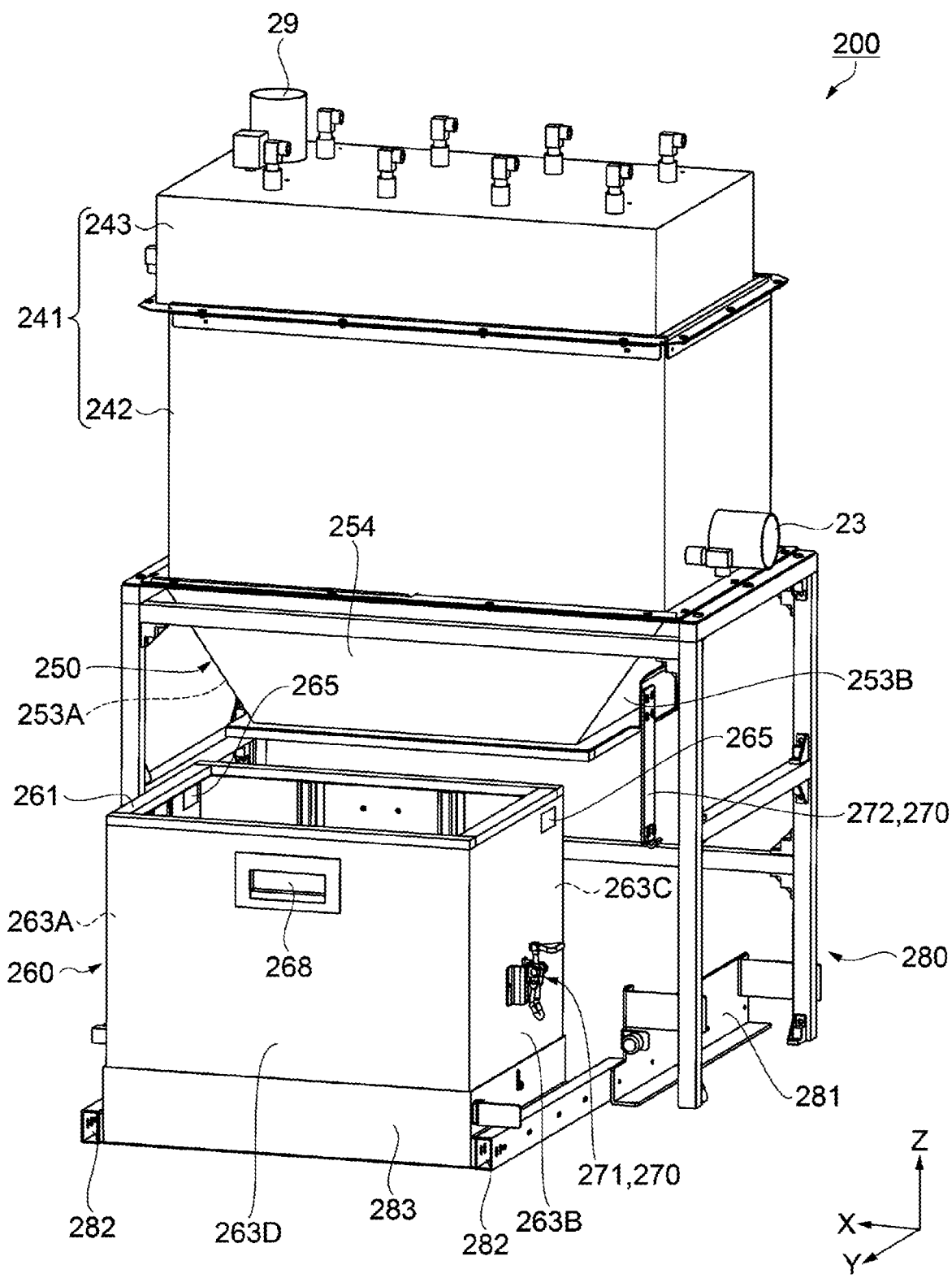
FIG. 9 is an explanatory drawing illustrating the procedure of detaching the container box from the hopper.

FIGS. 7 to 9 is an explanatory drawing illustrating a procedure in the powder container 200 of detaching the container box 260 from the hopper 250. Specifically, FIG. 7 is a diagram illustrating a state in which the container box 260 is attached to the hopper 250. FIG. 8 is a diagram illustrating a state in which the container box 260 has been detached from the hopper 250. FIG. 9 is a diagram illustrating a state in which the container box 260 detached from the hopper 250 is moved to a portion external to the sheet manufacturing apparatus 100 (housing 220). Note that when viewed in the order reversed from FIG. 7 to FIG. 9, that is, in the order of FIG. 9 to FIG. 7, it will be a procedure for attaching the container box 260 to the hopper 250.

The powder container 200 is fixed inside the housing 220 with a frame 280 illustrated in FIGS. 7 to 9, a bracket (not shown), or the like. Specifically, as illustrated in FIG. 2, the container box 260 is installed in the right surface portion 224 of the housing 220 and near the inner side of the dust collecting portion cover 231.

As illustrated in FIG. 7, a hooking portion 271 is installed at an upper middle portion of the front side surface 263A constituting the side surface 263 of the container box 260 in the +X direction and at an upper middle portion of the rear side surface 263B of the side surface 263 in the −X direction. Furthermore, a receiving portion 272 corresponding to the relevant hooking portion 271 is installed at the middle portion and on the second opening portion 252 side of the front inclined surface 253A of the hopper 250 in the +X direction, and at the middle portion and on the second opening portion 252 side of the rear inclined surface 253B in the −X direction. Note that the hooking portion 271 and the receiving portion 272 constitutes a so-called latch lock 270.

By hooking (engaging) each hooking portion 271 to the corresponding receiving portion 272, the container box 260 can be attached to the hopper 250. Conversely, by unhooking (disengaging) each hooking portion 271 from the corresponding receiving portion 272, the container box 260 can be detached from the hopper 250. Note that when the container box 260 is attached to the hopper 250, the opening portion 261 of the container box 260 and the second opening portion 252 of the hopper 250 are adhered to each other without any gap in between.

Hereinafter, a procedure of detaching the container box 260 and, subsequently, attaching the container box 260, which is performed by the user, will be described.

When the instruction of discharging the powder P1 is notified through the display panel 161 by the control unit 150 and when the user performs the process (discarding) pertaining to the powder P1, the user first performs a touch operation on "powder process", for example, displayed, as maintenance mode, in the display area in the display panel 161. When touch operation on the "powder process" is performed, the control unit 150 determines that opening of the dust collecting portion cover 231 has been instructed and releases the electromagnetic lock 235.

As illustrated in FIG. 2, the user opens the dust collecting portion cover 231 with the released electromagnetic lock 235. When the dust collecting portion cover 231 is opened, the powder container 200 becomes exposed. The user facing the powder container 200 inserts both hands towards the two side surfaces 263, namely, the front side surface 263A and the rear side surface 263B of the container box 260, and releases the engaged latch locks 270 installed on the two side surfaces 263. With such a motion, the container box 260 is disengaged from the hopper 250 and is detached from the hopper 250.

Note that the container box 260 is fixed to stationary frames 281, which are bridged across the front side (the +X direction) and across the rear side (the −X direction) of the frame 280, through support frames 282 and a tray 283. The tray 283 is a member to mount the container box 260. The tray 283 is box shaped and is fixed to the support frames 282. When the container box 260 and the hopper 250 are disengaged from each other, the support frames 282 are configured to move relative to the stationary frames 281 with the container box 260 mounted on the tray 283.

In the present exemplary embodiment, when the container box 260 and the hopper 250 are disengaged from each other, the support frames 282 are configured to move from the disengaged position, serving as a reference position of the container box 260, to a predetermined position which is in the right direction (the +Y direction) and which is where the container box 260 is located outside the housing 220. Note that the predetermined position where the container box 260 is drawn out to the position outside the housing 220 is referred to as a drawn-out position.

The support frames 282 are configured to move in the left-right direction (the Y direction) between the reference position and the drawn-out position. Accordingly, when detached from the hopper 250, the container box 260 supported by the support frames 282 mounted on the tray 283 is capable of moving in the left-right direction (the Y direction).

After the latch lock 270 is released, the user places a hand on a hand hold 268 of the container box 260 and pulls the hand hold 268 to the near side, which is the right direction (the +Y direction). With such a motion, the container box 260 mounted on the tray 283 is drawn out to the near side (the right direction) while being supported by the support frames 282.

Subsequently, the user detaches the container box 260 from the tray 283 while in a state in which the container box 260 has been drawn out to the drawn-out position, which is outside the housing 220. Specifically, by lifting the container box 260, relative to the tray 283, upwards, the tray 283 can be detached from the tray 283 easily. In such a state, the user discards the powder P1 that has accumulated in the container box 260.

After discarding the powder P1 inside the container box 260, the user mounts the empty container box 260 from above the tray 283 with a reversed motion with respect to when the container box 260 was detached from the tray 283. Subsequently, by pushing the container box 260, which is mounted on the tray 283, in the left direction (the −Y direction), the user moves the support frames 282 relative to the stationary frames 281 and moves the support frames 282 into the housing 220. Subsequently, the support frames 282 returning to the reference position stop moving.

Subsequently, the user engages the latch locks 270 through a reversed procedure with respect to when the latch locks 270 were released to attach the container box 260 to the hopper 250. Note that when the container box 260 is detached from the hopper 250, the container box 260 is lifted a few millimeters from the tray 283. Conversely, when the container box 260 is attached to the hopper 250, the container box 260 is lowered by the lifted few millimeters; accordingly, the container box 260 is reliably mounted on the tray 283.

Subsequently, after closing the dust collecting portion cover 231, the user performs a touch operation on a display area in the display panel 161 displaying as a maintenance mode, for example, "powder process completed". When a touch operation is performed on the area displaying "powder process completed", the control unit 150 determines that an instruction to close the dust collecting portion cover 231 has been made and sets the electromagnetic lock 235.

At the same time, the control unit 150 drives the optical sensor 300 and detects the light quantity. When the detected light quantity is larger than the standard light quantity, the control unit 150 determines that the container box 260 is empty and that the powder P1 inside the container box 260 has been discharged, and transitions from the maintenance mode to the paper manufacturing mode.

The following effects can be obtained with the present exemplary embodiment.

The powder container 200 of the present exemplary embodiment includes the filters 240, the hopper 250, the container box 260, and the optical sensor 300. The filters 240 separate the air and the powder P1 from each other. The hopper 250 includes the first opening portion 251 installed below the filters 240, a second opening portion 252 that is disposed below the first opening portion 251 and that has an opening area that is smaller than that of the first opening portion 251, and the inclined surfaces 253 (the front inclined surface 253A, the rear inclined surface 253B, and the left inclined surface 253C) that couple the first opening portion 251 and the second opening portion 252 to each other and that partially overlap the filters 240 in plan view. The container box 260 below the hopper 250 engages with the second opening portion 252 and is installed in a detachable manner. The container box 260 contains the powder P1 falling through the second opening portion 252. The optical sensor 300 is installed outside the container box 260 so as to oppose the upper side of the side surfaces 263 (the front side surface 263A and the rear side surface 263B) of the container box 260, at a portion near the second opening portion 252 and near the side of the inclined surface 253 (the left inclined surface 253C) in the lower direction. The optical sensor 300 detects the height of the powder P1 accumulated in the container box 260 by emitting light in a direction extending along the side of the inclined surface 253 (the left inclined surface 253C) in the lower direction so that the light transmits through areas on the upper side of the side surfaces 263 (the front side surface 263A and the rear side surface 263B) of the container box 260, and by receiving the emitted light. Note that in the present exemplary embodiment, the container box 260 includes the window portions 265 that have translucency in areas of the side surfaces 263 (the front side surface 263A and the rear side surface 263B) through which the light is transmitted.

According to the powder container 200 configured in the above manner, the optical sensor 300 is installed outside the container box 260 so as to oppose the upper sides of the side surfaces 263 (the front side surface 263A and the rear side surface 263B) of the container box 260, and at a portion near the second opening portion 252 and near the side of the inclined surface 253 (the left inclined surface 253C) in the lower direction, which is where the powder P1 tends to accumulate high. With the above, the accumulated height of the powder P1 can be ascertained in an accurate manner and an overflow of the powder P1 from the container box 260 can be prevented from occurring.

Furthermore, according to the powder container 200, when the container box 260 is configured of a plate member formed of metal such as, for example, aluminum that does not transmit light, the light can be made to transmit through the container box 260 by providing the window portions 265 that have translucency. By providing the window portions 265, the quality (rigidity) required for the container box 260 can be improved.

In the powder container 200 of the present exemplary embodiment, when in plan view viewed in the +Z direction, the inclined surface is not provided in one directional side of the hopper 250 corresponding to one side, among the four sides of the first opening portion 251 and that of the second opening portion 252 forming a rectangular shape.

According to the powder container 200 configured in the above manner, since the inclined surface 253 is not formed in one directional side, work (for example, a process pertaining to the powder P1 in the container box 260) can be performed while facing the powder container 200 in the direction in which the inclined surface 253 is not formed. The area and the volume needed in providing the inclined surface 253 can be reduced and a reduction in size of the powder container 200 can be achieved.

2. Second Exemplary Embodiment

Hereinafter, a second exemplary embodiment of the present disclosure will be described with reference to the drawings.

Figure 10:
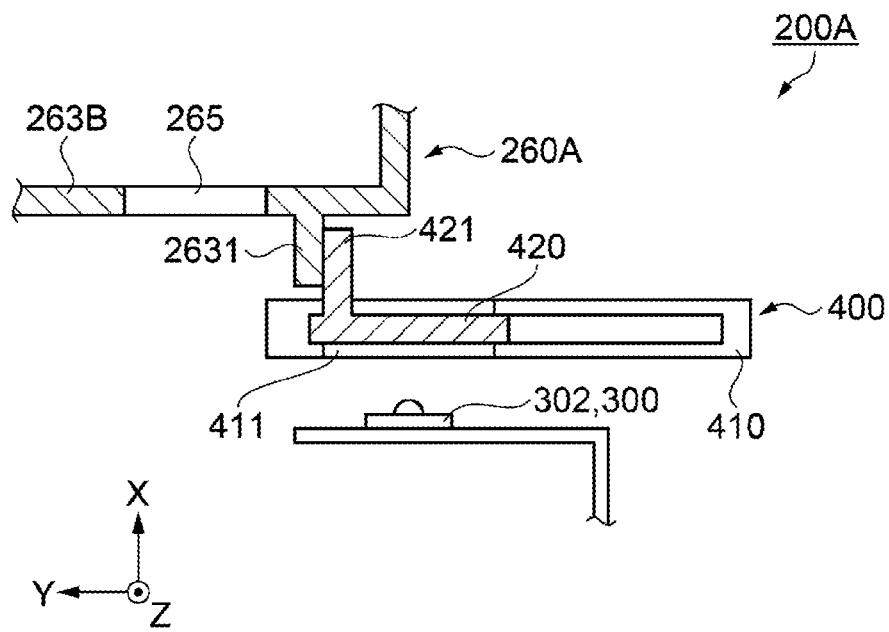
FIG. 10 is a schematic diagram that illustrates a configuration of a powder container according to a second exemplary embodiment.
Figure 11:
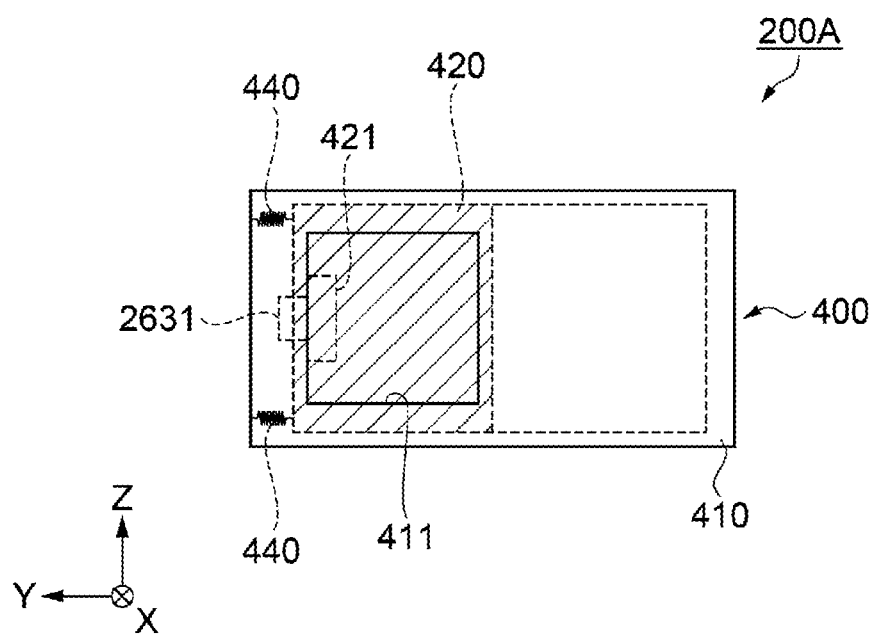
FIG. 11 is a schematic diagram that illustrates a configuration of a powder container.
Figure 12:
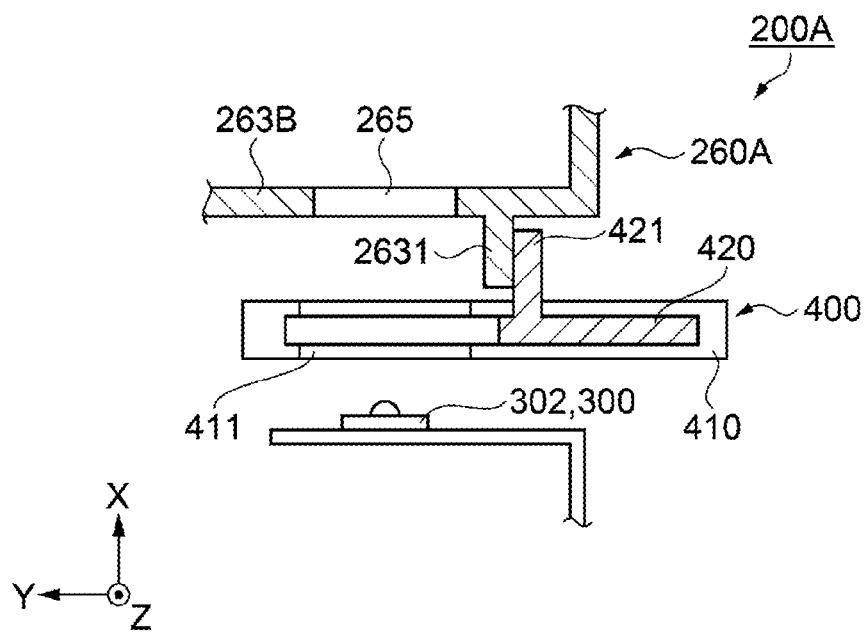
FIG. 12 is a schematic diagram that illustrates a configuration of a powder container.
Figure 13:
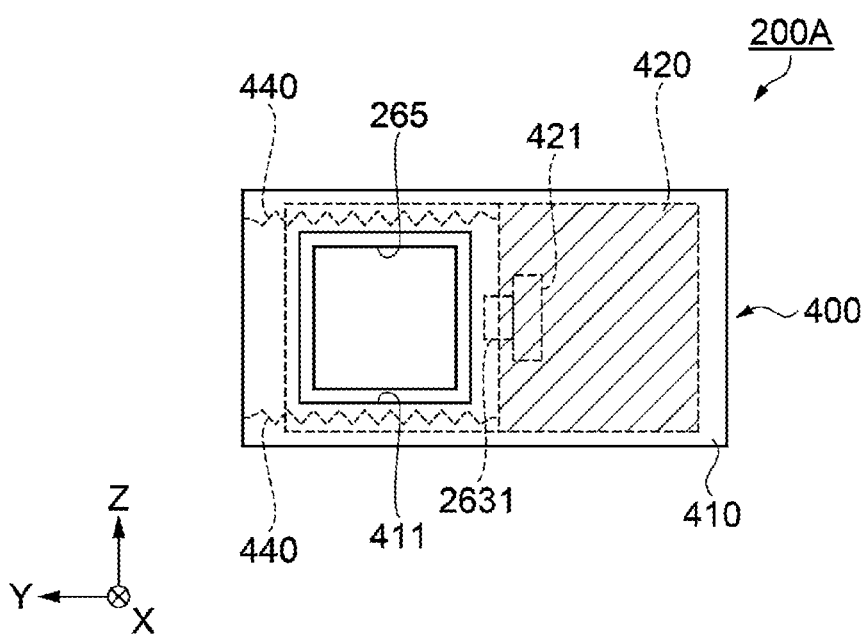
FIG. 13 is a schematic diagram that illustrates the configuration of the powder container.

FIGS. 10 to 13 are schematic diagrams illustrating a configuration of a powder container 200A according to the present exemplary embodiment. Specifically, FIG. 10 is a schematic cross-sectional view taken in the horizontal direction illustrating a state in which a shielding member 420 is shielding an opening portion 411. FIG. 11 is a schematic side view of the state illustrated in FIG. 10 viewed from behind a shielding mechanism 400. Furthermore, FIGS. 10 and 11 illustrates a state in which a protruding portion 2631 of a container box 260A is starting to abut against a protruding portion 421 of the shielding member 420. FIG. 12 is a schematic cross-sectional view taken in the horizontal direction illustrating a state in which the shielding member 420 is opening the opening portion 411. FIG. 13 is a schematic side view of the state illustrated in FIG. 12 viewed from behind the shielding mechanism 400. Furthermore, FIGS. 12 and 13 illustrates a state in which the protruding portion 2631 of the container box 260A is ending abutting against the protruding portion 421 of the shielding member 420.

Compared with the powder container 200 of the first exemplary embodiment, the powder container 200A of the present exemplary embodiment is different in that the powder container 200A includes the shielding member 420 that shields the path of the light from the optical sensor 300. Furthermore, the present exemplary embodiment includes the shielding mechanism 400 to operate the shielding member 420. Other configurations are similar to those of the first exemplary embodiment.

When the container box 260A is at the reference position, the shielding mechanism 400 is installed so as to oppose the window portion 265 installed in the rear side surface 263B of the container box 260A. Furthermore, the shielding mechanism 400 is installed between the rear side surface 263B (specifically, the window portion 265) and the light receiving element 302 of the optical sensor 300. Furthermore, the shielding mechanism 400 is fixed with an arm (not shown) extending from the frame 280.

As illustrated in FIGS. 11 and 12, the shielding mechanism 400 includes, when in side view from the rear direction (the −X direction), a shield frame 410 formed in a rectangular shape, and the opening portion 411 having a rectangular shape at the center-right side of the shield frame 410. Furthermore, a rectangular shielding member 420 is installed inside the shield frame 410. The shielding member 420 slides on the inner surface of the shield frame 410 to move in the left-right direction (the Y direction).

When the shielding member 420 moves in the rightmost direction (the +Y direction), the shielding member 420 covers the area of the opening portion 411, and when the shielding member 420 moves in the leftmost direction (−Y direction), the shielding member 420 opens the opening portion 411. Two tension coil springs 440 are installed in the right (+Y direction) upper portion and the right (+Y direction) lower portion of the shielding member 420. One end of the tension coil spring 440 is fixed to the shield frame 410 and the other end is fixed to an end portion of the shielding member 420 on the right side (the +Y direction). The protruding portion 421 that protrudes in the direction extending towards the window portion 265 is installed at the center portion of an end portion on the right side (the +Y direction) of the shielding member 420.

As illustrated in FIG. 10, the container box 260A of the present exemplary embodiment is different from the container box 260 of the first exemplary embodiment in that the container box 260A includes the protruding portion 2631 that protrudes towards the outer side is provided on the left side of the window portion 265 in the rear side surface 263B. Other configurations are similar to those of the first exemplary embodiment.

An operation of the shielding member 420 will be described.

When the container box 260A is moved from the reference position to discard the accumulated powder P1, as illustrated in FIGS. 12 and 13, the shielding member 420, in a state in which the opening portion 411 is open, follows the container box 260A moving in the right direction (a direction intersecting the vertical direction) and starts to move in the right direction with the biasing force of the coil spring 440. Subsequently, as illustrated in FIGS. 10 and 11, the opening portion 411 is closed by the shielding member 420. In such a state, the light from the optical sensor 300 is not received by the light receiving element 302 due to the shielding member 420 shielding the path of the light.

Furthermore, as illustrated in FIGS. 10 and 11, in a state in which the opening portion 411 is closed by the shielding member 420, when the user moves the container box 260A from the right side to the left side to return the container box 260A, which has had the powder P1 be removed by the user, to the reference position, the protruding portion 2631 of the container box 260A abuts against the protruding portion 421 of the shielding member 420. Subsequently, as the container box 260A is moved further, the protruding portion 2631 pushes the protruding portion 421 of the shielding member 420, and countering the biasing force of the coil springs 440, moves the shielding member 420 in the left direction.

Furthermore, as illustrated in FIGS. 12 and 13, when the container box 260A is positioned at the reference position, the shielding member 420 will be positioned at the leftmost side such that the opening portion 411 is open. As illustrated in FIG. 13, in such a state, when in side view from the rear side, the window portion 265 is exposed through the opening portion 411. In such a state, the light receiving element 302 is capable of receiving the light from the optical sensor 300.

Hereinafter, operation of the shielding member 420 and control of a control unit (not shown) during the detachment of the container box 260A to the attachment of the container box 260A performed by the user will be described.

When the control unit drives the optical sensor 300 and determines that the amount of powder P1 accumulated in the container box 260A has reached the standard amount (is full), the paper manufacturing mode is transitioned to the maintenance mode. Note that the state in which the control unit determines that the standard amount has been reached will be referred to as a state in which the optical sensor 300 is "OFF". Conversely, a state in which the control unit determines that the standard amount has not been reached is referred to as a state in which the optical sensor 300 is "ON".

When determined that the amount of powder P1 accumulated in the container box 260A has reached the standard amount, the control unit of the present exemplary embodiment transitions to the maintenance mode and, similar to the first exemplary embodiment, suggest the "powder process" to the user. Note that is such a state, the state of the optical sensor 300 is "OFF".

Furthermore, as illustrated in FIGS. 12 and 13, such a state is a state in which the shielding member 420 has opened the opening portion 411. However, even if the opening portion 411 is open, due to the accumulated powder P1, the quantity of light received by the light receiving element 302 does not change, and the state of the optical sensor 300 is "OFF".

In a case in which the shielding member 420 is not installed and the container box 260A is moved towards the drawn-out position from the reference position, when the control unit is continuously driving the optical sensor 300 and is detecting the amount of the powder P1, since the container box 260A moves, there will be no powder P1 that blocks the light from the light emitting element 301, the light receiving element 302 will receive the light. However, in the present exemplary embodiment, when the user moves the container box 260A from the reference position to the drawn-out position, as illustrated in FIGS. 10 and 11, since the path of the light from the light emitting element 301 is shielded by the shielding member 420 closing the opening portion 411, the light receiving element 302 does not receive light.

The state in which the optical sensor 300 is "OFF" continues while the shielding member 420 continues to close the opening portion 411. In other words, the state in which the optical sensor 300 is "OFF" continues from when the container box 260A is moved from the reference position to the drawn-out position until, after the powder P1 is discarded, the empty container box 260A is moved from the drawn-out position to the reference position.

When the container box 260A is positioned at the reference position, as illustrated in FIGS. 12 and 13, the shielding member 420 opens the opening portion 411, which allows the light receiving element 302 to receive the light from the light emitting element 301. Accordingly, the state of the optical sensor 300 becomes "ON".

In other words, when the state of the optical sensor 300 becomes "OFF", the control unit suggests the "powder process" to the user, and after receiving the touch operation of the user performed on the "powder process", by confirming that the state of the optical sensor 300 has become "ON", the control unit is able to determine that the "powder process" has ended. Furthermore, the touch operation on "powder process completed" in the display panel 161 may be added in making above determination. Subsequently, when confirmed that the state of the optical sensor 300 has become "ON", the control unit transitions from the maintenance mode to the paper manufacturing mode.

In addition to obtaining the effects similar to those of the first exemplary embodiment, the following effects can be obtained in the present exemplary embodiment.

In powder container 200A of the present exemplary embodiment, the shielding member 420 is installed between the light receiving element 302 of the optical sensor 300 and the window portion 265, through which light is transmitted, installed in the rear side surface 263B of the container box 260A. Furthermore, the shielding member 420 following the movement of the container box 260A in the left-right direction (the Y direction), which is a movement in a direction intersecting the vertical direction, shields the path of the light.

The powder container 200A of the present exemplary embodiment uses the shielding member 420; accordingly, by confirming that the state of the optical sensor 300 has become "ON" from the "OFF" state (confirming that the shielding of the light path has been removed), the control unit can confirm whether the container box 260A is installed in a proper manner without having to add a new switch that detects the movement of the container box 260A or without having to execute a complex flowchart. Furthermore, transition from the maintenance mode to the paper manufacturing mode can be made easily. As described above, the control unit can perform a simple and reliable operation.

3. Modification

The hopper 250 of the first exemplary embodiment includes a rectangular first opening portion 251 and a rectangular second opening portion 252, and the container box 260 includes a rectangular opening portion 261. However, not limited to a rectangular shape, the opening portion may have a triangular shape, a polygonal shape having five or more corners, a shape formed of a circular shape and a straight line, and the like.

4. Modification

The container box 260 of the first exemplary embodiment directly engages the opening portion 261 with the second opening portion 252 of the hopper 250 and is installed in a detachable manner. However, not limited to the above, the second opening portion 252 and the container box 260 may be engaged with another member interposed in between, and does not have to be engaged directly.

5. Modification

Since the container box 260 of the first exemplary embodiment is configured of a metal plate member, the window portions 265 that transmit light of the optical sensor 300 are installed in the side surfaces 263 (specifically, the front side surface 263A and the rear side surface 263B) of the container box 260. However, when the side surfaces 263 of the container box 260 are not metal plate members but are configured of synthetic resin members that transmit light, the window portions 265 do not have to be installed.

6. Modification

The container box 260 of the first exemplary embodiment disposes the light emitting element 301 on one of the window portion 265 side and disposes the light receiving element 302 on the other window portion 265 side so that the light transmits through the window portions 265 installed in the two side surfaces 263 (the front side surface 263A and the rear side surface 263B) of the container box 260. However, the configuration of the optical sensor 300 is not limited to the above configuration and a reflective optical sensor may be used. Specifically, as the reflective optical sensor, a light emitting element and a light receiving element that receives reflective light may be installed on one of the window portion 265 side, and a reflection member that reflex the light from the light emitting element towards a light receiving element may be installed on the other window portion 265 side.

7. Modification

When detached from the hopper 250, the container box 260 of the first exemplary embodiment is configured to move in the left-right direction (the Y direction). However, not limited to the above, the direction in which the container box 260 moves can be any direction that intersects the vertical direction (the Z direction in the present exemplary embodiment). Accordingly, the direction intersecting the vertical direction (the Z direction) may not only be a direction that directly extends along the Z direction but may be a direction that extends in an oblique manner.

8. Modification

The container box 260 of the first exemplary embodiment directly contains (accumulates) the powder P1 in the container box 260. However, not limited to the above, a collection bag may be installed inside the container box 260 and the powder P1 may be contained in the installed collection bag. In such a case, the collection bag needs to be configured of a member (polyethylene, vinyl chloride, and the like) that transmits light from the optical sensor 300.

Note that the modification described above can be applied to the second exemplary embodiment as well.

Contents derived from the exemplary embodiments and the modifications described above will be described below.

A powder container including a filter that separates air and powder from each other, a hopper that includes a first opening portion installed below the filter, a second opening portion that is disposed below the first opening portion and that has an opening area that is smaller than that of the first opening portion, and an inclined surface that couples the first opening portion and the second opening portion to each other and that partially overlaps the filter in plan view, a container box that engages with the second opening portion at a portion below the hopper and that is installed in a detachable manner, the container box containing the powder falling through the second opening portion, and a detection sensor installed outside the container box so as to oppose a side surface of the container box, the detection sensor being installed near the second opening portion and near a side of the inclined surface in a lower direction. In the powder container, the detection sensor includes a light emitting element that emits light in a direction extending along the side of the inclined surface in the lower direction so that the light transmits through an area in the side surface of the container box, and a light receiving element that receives the light emitted from the light emitting element.

According to such a configuration, by installing the detection sensor (the light emitting element and the light receiving element) outside the container box, so as to oppose the side surface of the container box, and at a portion near the second opening portion and near the side of the inclined surface in the lower direction, which is where the powder tends to accumulate high, the accumulated height of the powder can be detected accurately, and the powder can be prevented from over flowing from the container box.

In the powder container described above, desirably, the container box has a window portion having translucency installed in the area in the side surface through which the light is transmitted.

According to such a configuration, when the container box is, for example, configured of a member formed of metal that does not transmit light of the detection sensor, the light can be made to transmit by providing the window portion that has translucency. Furthermore, by providing the window portion, the degree of freedom in the members constituting the side surface can be improved, and the quality (rigidity) required for the container box can be improved.

In the powder container described above, desirably, when in plan view, the hopper in one directional side is not provided with the inclined surface.

According to such a configuration, since the inclined surface is not formed in one directional side of the hopper, work (for example, a process pertaining to the powder in the container box) can be performed while facing the powder container in the direction in which the inclined surface is not formed. The area and the volume needed in providing the inclined surface can be reduced and a reduction in size of the powder container can be achieved.

In the powder container described above, desirably, when detached from the hopper, the container box is configured to move in a direction intersecting a vertical direction, and the powder container further includes a shielding member installed between the detection sensor and the side surface through which the light is transmitted, the shielding member following a movement of the container box in the direction intersecting the vertical direction to shield a path of the light.

The powder container of such a configuration uses the shielding member; accordingly, by confirming that the shielding of the light path has been removed, a confirmation on whether the container box is installed in a proper manner can be made without having to add a new switch that detects the movement of the container box in, for example, the direction intersecting the vertical direction or without having to execute a complex flowchart.

What is claimed is:

1. A powder container comprising:
a filter that separates air and powder from each other;
a hopper that includes
a first opening portion installed below the filter,
a second opening portion that is disposed below the first opening portion and that has an opening area that is smaller than that of the first opening portion, and
an inclined surface that couples the first opening portion and the second opening portion to each other and that partially overlaps the filter in plan view;
a container box that engages with the second opening portion below the hopper and that is installed in a detachable manner, the container box being configured to receive powder falling through the second opening portion; and
a detection sensor installed outside the container box so as to oppose a side surface of the container box, the detection sensor being installed adjacent the second opening portion and adjacent a side of the inclined surface in a lower direction, wherein
the detection sensor includes a light emitting element that emits light in a direction extending along the side of the inclined surface in the lower direction so that the light transmits through an area in the side surface of the container box, and a light receiving element that receives the light emitted from the light emitting element.

2. The powder container according to claim 1, wherein the container box has a window portion having translucency installed in the area in the side surface through which the light is transmitted.

3. The powder container according to claim 1, wherein in plan view, the hopper in one directional side is not provided with the inclined surface.

4. The powder container according to claim 1, wherein when detached from the hopper, the container box is configured to move in a direction intersecting a vertical direction, and
the powder container further includes a shielding member installed between the detection sensor and the side surface through which the light is transmitted, the shielding member following a movement of the container box in the direction intersecting the vertical direction to shield a path of the light.

* * * * *